(12) United States Patent
Cheng et al.

(10) Patent No.: US 10,355,832 B2
(45) Date of Patent: Jul. 16, 2019

(54) INFORMATION SENDING OR RECEIVING METHOD, USER EQUIPMENT, AND BASE STATION

(71) Applicant: HUAWEI TECHNOLOGIES CO., LTD., Shenzhen (CN)

(72) Inventors: Yan Cheng, Beijing (CN); Lixia Xue, Beijing (CN); Bingyu Qu, Beijing (CN); Yongxing Zhou, Beijing (CN); Weihua Liu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 15/836,900

(22) Filed: Dec. 10, 2017

(65) Prior Publication Data
US 2018/0102881 A1    Apr. 12, 2018

Related U.S. Application Data

(63) Continuation of application No. PCT/CN2015/081166, filed on Jun. 10, 2015.

(51) Int. Cl.
*H04L 1/18* (2006.01)
*H04L 5/00* (2006.01)
(Continued)

(52) U.S. Cl.
CPC ......... *H04L 1/1887* (2013.01); *H04L 1/1854* (2013.01); *H04L 1/1893* (2013.01);
(Continued)

(58) Field of Classification Search
CPC ... H04L 1/1887; H04L 1/1896; H04L 1/1854; H04L 5/0055; H04W 72/042; H04W 72/0446; H04W 72/14; H04W 74/02
See application file for complete search history.

(56) References Cited

U.S. PATENT DOCUMENTS 9,608,778 B2 * 3/2017 Malladi ............... H04L 27/2602
2012/0213170 A1   8/2012 Choi et al.
(Continued)

FOREIGN PATENT DOCUMENTS

CN    101414900 A    4/2009
CN    104067681 A    9/2014
(Continued)

*Primary Examiner* — Hoang-Chuong Q Vu
(74) *Attorney, Agent, or Firm* — Kilpatrick Townsend & Stockton, LLP

(57) ABSTRACT

Embodiments of this application disclose an information sending or receiving method at user equipment, which includes: determining a frame structure of a serving cell, where a radio frame corresponding to the frame structure includes at least one downlink subframe, at least one uplink subframe, and at least one special subframe, and the special subframe is a first special subframe or a second special subframe; and sending or receiving information in the serving cell based on the frame structure, where the special subframe includes a symbol used for downlink transmission, a guard period, and a symbol used for uplink transmission, a quantity of symbols used for downlink transmission is greater than a quantity of symbols used for uplink transmission in the first special subframe, and a quantity of symbols used for downlink transmission is less than a quantity of symbols used for uplink transmission in the second special subframe.

15 Claims, 4 Drawing Sheets

(51) Int. Cl.
*H04W 72/04* (2009.01)
*H04W 72/14* (2009.01)
*H04W 28/04* (2009.01)

(52) U.S. Cl.
CPC .......... *H04L 5/0055* (2013.01); *H04W 28/04* (2013.01); *H04W 72/0446* (2013.01); *H04W 72/14* (2013.01); *H04W 72/042* (2013.01)

(56) References Cited

U.S. PATENT DOCUMENTS

| | | | | |
|---|---|---|---|---|
| 2013/0194980 | A1* | 8/2013 | Yin | H04L 1/1607 370/280 |
| 2013/0286902 | A1* | 10/2013 | Chen | H04W 24/02 370/280 |
| 2014/0328312 | A1* | 11/2014 | Seo | H04L 1/1861 370/329 |
| 2015/0043392 | A1 | 2/2015 | Susitaival et al. | |
| 2015/0351091 | A1* | 12/2015 | Yang | H04B 7/2643 370/329 |
| 2016/0119105 | A1* | 4/2016 | Jiang | H04L 5/0055 370/329 |
| 2016/0192355 | A1 | 6/2016 | Yu et al. | |
| 2017/0311322 | A1* | 10/2017 | Kim | H04W 72/04 |

FOREIGN PATENT DOCUMENTS

| | | |
|---|---|---|
| CN | 104348602 A | 2/2015 |
| EP | 2863571 A1 | 4/2015 |
| WO | 2010133031 A1 | 11/2010 |

* cited by examiner

INFORMATION SENDING OR RECEIVING METHOD, USER EQUIPMENT, AND BASE STATION

CROSS-REFERENCE TO RELATED APPLICATIONS

This application is a continuation of International Application No. PCT/CN2015/081166, filed on Jun. 10, 2015, the disclosure of which is hereby incorporated by reference in its entirety.

TECHNICAL FIELD

The present application relates to the field of communications technologies, and in particular, to an information sending or receiving method, user equipment, and a base station.

BACKGROUND

An existing Long Term Evolution (LTE) system includes two types of frame structures. A frame structure type 1 is shown in FIG. 1: One radio frame includes 20 timeslots whose lengths are 0.5 ms, and one subframe includes two adjacent timeslots. The frame structure is applied to frequency division duplex (FDD). A frame structure type 2 is shown in FIG. 2: One radio frame includes two half radio frames whose lengths are 5 ms, and each half radio frame includes five subframes whose lengths are 1 ms. In the five subframes, there are four normal subframes and one special subframe. The normal subframe includes two timeslots whose lengths are 0.5 ms. The special subframe includes three special timeslots: a downlink pilot timeslot (DwPTS), a guard period (GP), and an uplink pilot timeslot (UpPTS). The frame structure is applied to time division duple(TDD) For TDD, seven uplink-downlink configurations shown in Table 1 exist in the existing system. x .

TABLE 1

| Uplink-downlink configuration | Downlink-to-uplink switch-point periodicity (Downlink-to-Uplink Switch-point periodicity) | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the LTE system, to support a hybrid automatic repeat request mechanism, user equipment needs to feed back a hybrid automatic repeat request-acknowledgment (HARQ-ACK) of physical downlink shared channel (PDSCH) transmission to a base station by using a physical uplink control channel (PUCCH) and a physical uplink shared channel (PUSCH). The hybrid automatic repeat request-acknowledgment may also be referred to as an ACK (acknowledgment)/NACK (negative acknowledgment) for short. The user equipment needs to receive, by using a physical hybrid automatic repeat request indicator channel (PHICH), an HARQ-ACK corresponding to a physical uplink shared channel (PUSCH).

In the LTE system, for FDD, an HARQ-ACK corresponding to a PDSCH transmitted in a downlink subframe n−4 is fed back in an uplink subframe n; for TDD, an HARQ-ACK corresponding to a PDSCH transmitted in a downlink subframe n-k is fed back in an uplink subframe n, and k belongs to a set K. A definition of K for each TDD uplink-downlink configuration is shown in Table 2.

TABLE 2

| Uplink-downlink configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It can be learned from Table 2 that in an existing TDD system, different uplink-downlink configurations have different HARQ-ACK timing, and complexity of the TDD system is higher than that of an FDD system.

SUMMARY

Embodiments of the present application provide an information transmission method, a device, and a base station, so that different uplink-downlink configurations can have same HARQ-ACK timing in a TDD system, and complexity of the TDD system is reduced.

To resolve the foregoing technical problem, the embodiments of the present application disclose the following technical solutions:

According to a first aspect, user equipment is provided, including:

a processor, configured to determine a frame structure of a serving cell, where a radio frame corresponding to the frame structure includes at least one downlink subframe, at least one uplink subframe, and at least one special subframe, the special subframe is a first special subframe or a second special subframe, the at least one downlink subframe includes a subframe l, the at least one uplink subframe includes a subframe l+4, the at least one special subframe includes a subframe l+5, and the subframe l+5 is the first special subframe, where l is a positive integer, l is an odd multiple of 5, and l is a subframe number; and a transceiver, configured to send or receive information in the serving cell based on the frame structure determined by the processor, where the special subframe includes a symbol used for downlink transmission, a guard period GP, and a symbol used for uplink transmission, a quantity of symbols used for downlink transmission is greater than a quantity of symbols used for uplink transmission in the first special subframe, a quantity of symbols used for downlink transmission is less than a quantity of symbols used for uplink transmission in the second special subframe, the downlink transmission includes physical downlink control channel transmission, and the uplink transmission includes hybrid automatic repeat request-acknowledgment HARQ-ACK transmission.

With reference to the first aspect, in a first possible implementation of the first aspect, each radio frame corresponding to the frame structure includes 10 subframes, and the second subframe and the seventh subframe in each radio frame are the first special subframes.

With reference to the first aspect and/or the first possible implementation of the first aspect, in a second possible implementation of the first aspect, in the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, where m is an integer, the subframe m is not the second subframe in each radio frame, and m is a subframe number.

With reference to the first aspect, and/or the first possible implementation of the first aspect, and/or the second possible implementation of the first aspect, in a third possible implementation of the first aspect, the processor is further configured to:

determine the frame structure of the serving cell according to an uplink-to-downlink ratio of the serving cell, where the following is specifically included:

when the uplink-to-downlink ratio of the serving cell is 1:9, each radio frame corresponding to the frame structure includes 10 subframes, where in each radio frame, the fourth subframe and the sixth subframe are the downlink subframes, the tenth subframe is the uplink subframe, and the first subframe, the second subframe, the third subframe, the fifth subframe, the seventh subframe, the eighth subframe, and the ninth subframe are the first special subframes; or when the uplink-to-downlink ratio of the serving cell is 2:8, each radio frame corresponding to the frame structure includes 10 subframes, where in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3:7, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4:6, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5:5, each radio frame corresponding to the frame structure includes 10 subframes, where in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

With reference to the first aspect, and/or the first possible implementation of the first aspect, and/or the second possible implementation of the first aspect, and/or the third possible implementation of the first aspect, in a fourth possible implementation of the first aspect, the transceiver is further configured to:

receive, in a subframe n in the serving cell, physical downlink shared channel transmission or a downlink control channel indicating downlink semi-persistent scheduling release, where n is an integer, and n is a subframe number; and send, in a subframe n+k, an HARQ-ACK corresponding to the physical downlink shared channel transmission or the downlink control channel that is received in the subframe n in the serving cell, where k is an integer, and when the subframe n is corresponding to the second subframe in each radio frame, a value of k is 5; or otherwise, a value of k is 4.

With reference to the first aspect, and/or the first possible implementation of the first aspect, and/or the second possible implementation of the first aspect, and/or the third possible implementation of the first aspect, in a fifth possible implementation of the first aspect, the transceiver is further configured to:

receive, in a subframe i, a downlink control channel that schedules a physical uplink shared channel; and send, in a subframe i+4 in the serving cell, the physical uplink shared channel scheduled by the downlink control channel, where i is an integer, and i is a subframe number.

With reference to the first aspect, and/or the first possible implementation of the first aspect, and/or the second possible implementation of the first aspect, and/or the third possible implementation of the first aspect, in a sixth possible implementation of the first aspect, the transceiver is further configured to:

send a physical uplink shared channel in a subframe j in the serving cell; and receive, in a subframe j+6, an HARQ-ACK corresponding to the physical uplink shared channel, where j is an integer, and j is a subframe number.

With reference to the first aspect, and/or the first possible implementation of the first aspect, and/or the second possible implementation of the first aspect, and/or the third possible implementation of the first aspect, in a seventh possible implementation of the first aspect, the transceiver is further configured to:

receive, in a subframe h, an HARQ-ACK corresponding to a physical uplink shared channel; and send, in a subframe h+4 in the serving cell, the physical uplink shared channel corresponding to the HARQ-ACK, where h is an integer, and h is a subframe number.

With reference to the first aspect, in an eighth possible implementation of the first aspect, each radio frame corresponding to the frame structure includes 10 subframes, and the first subframe, the second subframe, and the seventh subframe in each radio frame are the first special subframes.

With reference to the first aspect and/or the eighth possible implementation of the first aspect, in a ninth possible implementation of the first aspect, the processor is further configured to:

determine the frame structure of the serving cell according to an uplink-to-downlink ratio of the serving cell, where the following is specifically included:

when the uplink-to-downlink ratio of the serving cell is 1:9, each radio frame includes 10 subframes, where in each radio frame, the sixth subframe is the downlink subframe, the tenth subframe is the uplink subframe, and the first subframe, the second subframe, the third subframe, the fourth subframe, the fifth subframe, the seventh subframe, the eighth subframe, and the ninth subframe are the first special subframes; or when the uplink-to-downlink ratio of the serving cell is 2:8, each radio frame includes 10 subframes, where in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3:7, each radio frame includes 10 subframes, where in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4:6, each radio frame includes 10 subframes, where in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5:5, each radio frame includes 10 subframes, where in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

With reference to the first aspect, and/or the eighth possible implementation of the first aspect, and/or the ninth possible implementation of the first aspect, in a tenth possible implementation of the first aspect, the transceiver is further configured to:

receive, in a subframe n in the serving cell, physical downlink shared channel transmission or a downlink control channel indicating downlink semi-persistent scheduling release, where n is an integer, and n is a subframe number; and send, in a subframe n+k, an HARQ-ACK response corresponding to the physical downlink shared channel transmission or the downlink control channel that is received in the subframe n in the serving cell, where k is an integer, and when the subframe n is corresponding to the first subframe in each radio frame, a value of k is 4; or otherwise, a value of k is 5.

With reference to the first aspect, and/or the eighth possible implementation of the first aspect, and/or the ninth possible implementation of the first aspect, in an eleventh possible implementation of the first aspect, the transceiver is further configured to:

receive, in a subframe i, a downlink control channel that schedules a physical uplink shared channel; and send, in a subframe i+5 in the serving cell, the physical uplink shared channel scheduled by the downlink control channel, where i is an integer, and i is a subframe number.

With reference to the first aspect, and/or the eighth possible implementation of the first aspect, and/or the ninth possible implementation of the first aspect, in a twelfth possible implementation of the first aspect, the transceiver is further configured to:

send a physical uplink shared channel in a subframe j in the serving cell; and receive, in a subframe j+5, an HARQ-ACK corresponding to the physical uplink shared channel, where j is an integer, and j is a subframe number.

With reference to the first aspect, and/or the eighth possible implementation of the first aspect, and/or the ninth possible implementation of the first aspect, in a thirteenth possible implementation of the first aspect, the transceiver is further configured to:

receive, in a subframe h, an HARQ-ACK corresponding to a physical uplink shared channel; and send, in a subframe h+5 in the serving cell, the physical uplink shared channel corresponding to the HARQ-ACK, where h is an integer, and h is a subframe number.

With reference to the first aspect, in a fourteenth possible implementation of the first aspect, the following is included:

each radio frame corresponding to the frame structure includes 10 subframes, and in each radio frame, the sixth subframe is the downlink subframe, the tenth subframe is the uplink subframe, the first subframe, the second subframe, the third subframe, the fifth subframe, the seventh subframe, and the ninth subframe are the first special subframes, and the fourth subframe and the eighth subframe are the second special subframes.

With reference to the first aspect, in a fifteenth possible implementation of the first aspect, the following is included:

each radio frame corresponding to the frame structure includes 10 subframes, and in each radio frame, the fourth subframe and the sixth subframe are the downlink subframes, the tenth subframe is the uplink subframe, the first subframe, the second subframe, the third subframe, the fifth subframe, the seventh subframe, and the ninth subframe are the first special subframes, and the eighth subframe is the second special subframe.

With reference to the fourteenth possible implementation of the first aspect and/or the fifteenth possible implementation of the first aspect, in a sixteenth possible implementation of the first aspect, the transceiver is further configured to:

receive, in a subframe i, a downlink control channel that schedules a physical uplink shared channel; and send, in a subframe i+4 in the serving cell, the physical uplink shared channel scheduled by the downlink control channel, where i is an integer, and i is a subframe number.

With reference to the fourteenth possible implementation of the first aspect and/or the fifteenth possible implementation of the first aspect, in a seventeenth possible implementation of the first aspect, the transceiver is further configured to:

send a physical uplink shared channel in a subframe j in the serving cell; and receive, in a subframe j+4, an HARQ-ACK corresponding to the physical uplink shared channel, where j is an integer, and j is a subframe number.

With reference to the fourteenth possible implementation of the first aspect and/or the fifteenth possible implementation of the first aspect, in an eighteenth possible implementation of the first aspect, the transceiver is further configured to:

receive, in a subframe h, an HARQ-ACK corresponding to a physical uplink shared channel; and send, in a subframe h+4 in the serving cell, the physical uplink shared channel corresponding to the HARQ-ACK, where h is an integer, and h is a subframe number.

With reference to the eighteenth possible implementation of the first aspect, in a nineteenth possible implementation of the first aspect, the transceiver module is further configured to:

if the subframe h+4 is the downlink subframe or the first special subframe, send, in a subframe h+4+8×a in the serving cell, the physical uplink shared channel corresponding to the HARQ-ACK, where a is a positive integer greater than or equal to 1, and the subframe h+4+8×a is the first available uplink subframe or second special subframe.

With reference to the first aspect, and/or the first possible implementation of the first aspect, and/or the second possible implementation of the first aspect, and/or the third possible implementation of the first aspect, and/or the fourth possible implementation of the first aspect, and/or the fifth possible implementation of the first aspect, and/or the sixth possible implementation of the first aspect, and/or the seventh possible implementation of the first aspect, and/or the eighth possible implementation of the first aspect, and/or the ninth possible implementation of the first aspect, and/or the tenth possible implementation of the first aspect, and/or the eleventh possible implementation of the first aspect, and/or the twelfth possible implementation of the first aspect, and/or the thirteenth possible implementation of the first aspect, and/or the fourteenth possible implementation of the first aspect, and/or the fifteenth possible implementation of the first aspect, and/or the sixteenth possible implementation of the first aspect, and/or the seventeenth possible implementation of the first aspect, and/or the eighteenth possible implementation of the first aspect, and/or the nineteenth possible implementation of the first aspect, in a twentieth possible implementation of the first aspect, if the user equipment is legacy user equipment, an uplink-downlink configuration that is of the serving cell and is configured for the user equipment is an uplink-downlink configuration 0.

With reference to the first aspect, and/or the first possible implementation of the first aspect, and/or the second possible implementation of the first aspect, and/or the third possible implementation of the first aspect, and/or the fourth possible implementation of the first aspect, and/or the fifth possible implementation of the first aspect, and/or the sixth possible implementation of the first aspect, and/or the seventh possible implementation of the first aspect, and/or the eighth possible implementation of the first aspect, and/or the ninth possible implementation of the first aspect, and/or the tenth possible implementation of the first aspect, and/or the eleventh possible implementation of the first aspect, and/or the twelfth possible implementation of the first aspect, and/or the thirteenth possible implementation of the first aspect, and/or the fourteenth possible implementation of the first aspect, and/or the fifteenth possible implementation of the first aspect, and/or the sixteenth possible implementation of the first aspect, and/or the seventeenth possible implementation of the first aspect, and/or the eighteenth possible implementation of the first aspect, and/or the nineteenth possible implementation of the first aspect, and/or the twentieth possible implementation of the first aspect, in a twenty-first possible implementation of the first aspect, if the user equipment is legacy user equipment, the transceiver is further configured to:

send or receive information in the serving cell based on the frame structure and according to HARQ timing in LTE release 8.

With reference to the first aspect, and/or the first possible implementation of the first aspect, and/or the second possible implementation of the first aspect, and/or the third possible implementation of the first aspect, and/or the fourth possible implementation of the first aspect, and/or the fifth possible implementation of the first aspect, and/or the sixth possible implementation of the first aspect, and/or the seventh possible implementation of the first aspect, and/or the eighth possible implementation of the first aspect, and/or the ninth possible implementation of the first aspect, and/or the tenth possible implementation of the first aspect, and/or the eleventh possible implementation of the first aspect, and/or the twelfth possible implementation of the first aspect, and/or the thirteenth possible implementation of the first aspect, and/or the fourteenth possible implementation of the first aspect, and/or the fifteenth possible implementation of the first aspect, and/or the sixteenth possible implementation of the first aspect, and/or the seventeenth possible implementation of the first aspect, and/or the eighteenth possible implementation of the first aspect, and/or the nineteenth possible implementation of the first aspect, and/or the twentieth possible implementation of the first aspect, and/or the twenty-first possible implementation of the first aspect, in a twenty-second possible implementation of the first aspect, in the frame structure of the serving cell, each subframe is a subframe of 1 ms, the first special subframe includes 12 symbols used for downlink transmission, a GP whose duration is one symbol, and one symbol used for uplink transmission, and the second special subframe includes one symbol used for downlink transmission, a GP whose duration is one symbol, and 12 symbols used for uplink transmission.

According to a second aspect, a base station is provided, including:

a processor, configured to determine a frame structure of a serving cell, where each radio frame corresponding to the frame structure includes at least one downlink subframe, at least one uplink subframe, and at least one special subframe, the special subframe is a first special subframe or a second special subframe, the at least one downlink subframe includes a subframe l, the at least one uplink subframe includes a subframe l+4, the at least one special subframe includes a subframe l+5, and the subframe l+5 is the first special subframe, where l is an integer, l is an odd multiple of 5, and l is a subframe number; and a transceiver, configured to send information to or receive information from user equipment in the serving cell based on the frame structure determined by the processor, where the special subframe includes a time domain symbol used for downlink transmission, a guard period GP, and a time domain symbol used for uplink transmission, a quantity of time domain symbols used for downlink transmission is greater than a quantity of time domain symbols used for uplink transmission in the first special subframe, a quantity of time domain symbols used for downlink transmission is less than a quantity of time domain symbols used for uplink transmission in the second special subframe, the downlink transmission includes physical downlink control channel transmission, and the uplink transmission includes hybrid automatic repeat request-acknowledgment HARQ-ACK transmission.

With reference to the second aspect, in a first possible implementation of the second aspect, each radio frame corresponding to the frame structure includes 10 subframes, and the second subframe and the seventh subframe in each radio frame are the first special subframes.

With reference to the second aspect and/or the first possible implementation of the second aspect, in a second possible implementation of the second aspect, in the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, where m is an integer, the subframe m is not the second subframe in each radio frame, and m is a subframe number.

With reference to the second aspect, and/or the first possible implementation of the second aspect, and/or the second possible implementation of the second aspect, in a third possible implementation of the second aspect, the processor is further configured to:

determine the frame structure of the serving cell according to an uplink-to-downlink ratio of the serving cell, where the following is specifically included:

when the uplink-to-downlink ratio of the serving cell is 1:9, each radio frame corresponding to the frame structure includes 10 subframes, where in each radio frame, the fourth subframe and the sixth subframe are the downlink subframes, the tenth subframe is the uplink subframe, and the first subframe, the second subframe, the third subframe, the fifth subframe, the seventh subframe, the eighth subframe, and the ninth subframe are the first special subframes; or when the uplink-to-downlink ratio of the serving cell is 2:8, each radio frame corresponding to the frame structure includes 10 subframes, where in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3:7, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4:6, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5:5, each radio frame corresponding to the frame structure includes 10 subframes, where in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

With reference to the second aspect, and/or the first possible implementation of the second aspect, and/or the second possible implementation of the second aspect, and/or the third possible implementation of the second aspect, in a fourth possible implementation of the second aspect, the transceiver is further configured to:

send, to the user equipment in a subframe n in the serving cell, physical downlink shared channel transmission or a downlink control channel indicating downlink semi-persistent scheduling release, where n is an integer, and n is a subframe number; and receive, in a subframe n+k, an HARQ-ACK response that is fed back by the user equipment and is corresponding to the physical downlink shared channel transmission or the downlink control channel that is sent in the subframe n in the serving cell, where k is an integer, and when the subframe n is corresponding to the second subframe in each radio frame, a value of k is 5; or otherwise, a value of k is 4.

With reference to the second aspect, and/or the first possible implementation of the second aspect, and/or the second possible implementation of the second aspect, and/or the third possible implementation of the second aspect, and/or the fourth possible implementation of the second aspect, in a fifth possible implementation of the second aspect, the transceiver is further configured to:

send, to the user equipment in a subframe i, a downlink control channel that schedules a physical uplink shared channel; and receive, in a subframe i+4 in the serving cell, the physical uplink shared channel scheduled by the downlink control channel, where i is an integer, and i is a subframe number.

With reference to the second aspect, and/or the first possible implementation of the second aspect, and/or the second possible implementation of the second aspect, and/or the third possible implementation of the second aspect, and/or the fourth possible implementation of the second aspect, in a sixth possible implementation of the second aspect, the transceiver is further configured to:

receive, in a subframe j in the serving cell, a physical uplink shared channel sent by the user equipment; and send, in a subframe j+6, an HARQ-ACK corresponding to the physical uplink shared channel, where j is an integer, and j is a subframe number.

With reference to the second aspect, and/or the first possible implementation of the second aspect, and/or the second possible implementation of the second aspect, and/or the third possible implementation of the second aspect, and/or the fourth possible implementation of the second aspect, in a seventh possible implementation of the second aspect, the transceiver is further configured to:

send, in a subframe h, an HARQ-ACK corresponding to a physical uplink shared channel sent by the user equipment; and receive retransmission of the physical uplink shared channel in a subframe h+4 in the serving cell, where h is an integer, and h is a subframe number.

With reference to the second aspect, in an eighth possible implementation of the second aspect, each radio frame corresponding to the frame structure includes 10 subframes, and the first subframe, the second subframe, and the seventh subframe in each radio frame are the first special subframes.

With reference to the second aspect and/or the eighth possible implementation of the second aspect, in a ninth possible implementation of the second aspect, the processor is further configured to:

determine the frame structure of the serving cell according to an uplink-to-downlink ratio of the serving cell, where the following is specifically included:

when the uplink-to-downlink ratio of the serving cell is 1:9, each radio frame includes 10 subframes, where in each radio frame, the sixth subframe is the downlink subframe, the tenth subframe is the uplink subframe, and the first subframe, the second subframe, the third subframe, the fourth subframe, the fifth subframe, the seventh subframe, the eighth subframe, and the ninth subframe are the first special subframes; or when the uplink-to-downlink ratio of the serving cell is 2:8, each radio frame includes 10 subframes, where in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3:7, each radio frame includes 10 subframes, where in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4:6, each radio frame includes 10 subframes, where in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5:5, each radio frame includes 10 subframes, where in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

With reference to the second aspect, and/or the eighth possible implementation of the second aspect, and/or the ninth possible implementation of the second aspect, in a tenth possible implementation of the second aspect, the transceiver is further configured to:

send, to the user equipment in a subframe n in the serving cell, physical downlink shared channel transmission or a downlink control channel indicating downlink semi-persistent scheduling release, where n is an integer, and n is a subframe number; and receive, in a subframe n+k, a hybrid automatic repeat request-acknowledgment HARQ-ACK response that is fed back by the user equipment and is corresponding to the physical downlink shared channel transmission or the downlink control channel that is sent in the subframe n in the serving cell, where k is an integer, and when the subframe n is corresponding to the first subframe in each radio frame, a value of k is 4; or otherwise, a value of k is 5.

With reference to the second aspect, and/or the eighth possible implementation of the second aspect, and/or the ninth possible implementation of the second aspect, in an eleventh possible implementation of the second aspect, the transceiver is further configured to:

send, to the user equipment in a subframe i, a downlink control channel that schedules a physical uplink shared channel; and receive, in a subframe i+5 in the serving cell, the physical uplink shared channel scheduled by the downlink control channel, where i is an integer, and i is a subframe number.

With reference to the second aspect, and/or the eighth possible implementation of the second aspect, and/or the ninth possible implementation of the second aspect, in a twelfth possible implementation of the second aspect, the transceiver is further configured to:

receive, in a subframe j in the serving cell, a physical uplink shared channel sent by the user equipment; and send, in a subframe j+5, an HARQ-ACK corresponding to the physical uplink shared channel, where j is an integer, and j is a subframe number.

With reference to the second aspect, and/or the eighth possible implementation of the second aspect, and/or the ninth possible implementation of the second aspect, in a thirteenth possible implementation of the second aspect, the transceiver is further configured to:

send, in a subframe h, an HARQ-ACK corresponding to a physical uplink shared channel sent by the user equipment; and receive retransmission of the physical uplink shared channel in a subframe h+5 in the serving cell, where h is an integer, and h is a subframe number.

With reference to the second aspect, in a fourteenth possible implementation of the second aspect, the following is included:

each radio frame corresponding to the frame structure includes 10 subframes, and in each radio frame, the sixth subframe is the downlink subframe, the tenth subframe is the uplink subframe, the first subframe, the second subframe, the third subframe, the fifth subframe, the seventh subframe, and the ninth subframe are the first special subframes, and the fourth subframe and the eighth subframe are the second special subframes.

With reference to the second aspect, in a fifteenth possible implementation of the second aspect, the following is included:

each radio frame corresponding to the frame structure includes 10 subframes, and in each radio frame, the fourth subframe and the sixth subframe are the downlink subframes, the tenth subframe is the uplink subframe, the first subframe, the second subframe, the third subframe, the fifth subframe, the seventh subframe, and the ninth subframe are the first special subframes, and the eighth subframe is the second special subframe.

With reference to the fourteenth possible implementation of the second aspect and/or the fifteenth possible implementation of the second aspect, in a sixteenth possible implementation of the second aspect, the transceiver is further configured to:

send, to the user equipment in a subframe i, a downlink control channel that schedules a physical uplink shared channel; and receive, in a subframe i+4 in the serving cell, the physical uplink shared channel scheduled by the downlink control channel, where i is an integer, and i is a subframe number.

With reference to the fourteenth possible implementation of the second aspect and/or the fifteenth possible implementation of the second aspect, in a seventeenth possible implementation of the second aspect, the transceiver is further configured to:

receive, in a subframe j in the serving cell, a physical uplink shared channel sent by the user equipment; and send, in a subframe j+4, an HARQ-ACK corresponding to the physical uplink shared channel, where j is an integer, and j is a subframe number.

With reference to the fourteenth possible implementation of the second aspect and/or the fifteenth possible implementation of the second aspect, in an eighteenth possible implementation of the second aspect, the transceiver is further configured to:

send, in a subframe h, an HARQ-ACK corresponding to a physical uplink shared channel sent by the user equipment; and receive retransmission of the physical uplink shared channel in a subframe h+4 in the serving cell, where h is an integer, and h is a subframe number.

With reference to the second aspect, in a nineteenth possible implementation of the second aspect, the transceiver is further configured to:

if the subframe h+4 is the downlink subframe or the first special subframe, receive retransmission of the physical uplink shared channel in a subframe h+4+8×a in the serving cell, where a is a positive integer greater than or equal to 1, and the subframe h+4+8×a is the first available uplink subframe or second special subframe.

With reference to the second aspect, and/or the first possible implementation of the second aspect, and/or the second possible implementation of the second aspect, and/or the third possible implementation of the second aspect, and/or the fourth possible implementation of the second aspect, and/or the fifth possible implementation of the second aspect, and/or the sixth possible implementation of the second aspect, and/or the seventh possible implementation of the second aspect, and/or the eighth possible implementation of the second aspect, and/or the ninth possible implementation of the second aspect, and/or the tenth possible implementation of the second aspect, and/or the eleventh possible implementation of the second aspect, and/or the twelfth possible implementation of the second aspect, and/or the thirteenth possible implementation of the second aspect, and/or the fourteenth possible implementation of the second aspect, and/or the fifteenth possible implementation of the second aspect, and/or the sixteenth possible implementation of the second aspect, and/or the seventeenth possible implementation of the second aspect, and/or the eighteenth possible implementation of the second aspect, and/or the nineteenth possible implementation of the second aspect, in a twentieth possible implementation of the second aspect, if the user equipment is legacy user equipment, the uplink-to-downlink ratio that is of the serving cell and is configured by the base station for the user equipment is an uplink-to-downlink ratio 0.

With reference to the second aspect, and/or the first possible implementation of the second aspect, and/or the second possible implementation of the second aspect, and/or the third possible implementation of the second aspect, and/or the fourth possible implementation of the second aspect, and/or the fifth possible implementation of the second aspect, and/or the sixth possible implementation of the second aspect, and/or the seventh possible implementation of the second aspect, and/or the eighth possible implementation of the second aspect, and/or the ninth possible implementation of the second aspect, and/or the tenth possible implementation of the second aspect, and/or the eleventh possible implementation of the second aspect, and/or the twelfth possible implementation of the second aspect, and/or the thirteenth possible implementation of the second aspect, and/or the fourteenth possible implementation of the second aspect, and/or the fifteenth possible implementation of the second aspect, and/or the sixteenth possible implementation of the second aspect, and/or the seventeenth possible implementation of the second aspect, and/or the eighteenth possible implementation of the second aspect, and/or the nineteenth possible implementation of the second aspect, and/or the twentieth possible implementation of the second aspect, in a twenty-first possible implementation of the second aspect, if the user equipment is legacy user equipment, the transceiver is further configured to:

send information to or receive information from the user equipment in the serving cell based on the frame structure and according to HARQ timing in LTE release 8.

With reference to the second aspect, and/or the first possible implementation of the second aspect, and/or the second possible implementation of the second aspect, and/or the third possible implementation of the second aspect, and/or the fourth possible implementation of the second aspect, and/or the fifth possible implementation of the second aspect, and/or the sixth possible implementation of the second aspect, and/or the seventh possible implementation of the second aspect, and/or the eighth possible implementation of the second aspect, and/or the ninth possible implementation of the second aspect, and/or the tenth possible implementation of the second aspect, and/or the eleventh possible implementation of the second aspect, and/or the twelfth possible implementation of the second aspect, and/or the thirteenth possible implementation of the second aspect, and/or the fourteenth possible implementation of the second aspect, and/or the fifteenth possible implementation of the second aspect, and/or the sixteenth possible implementation of the second aspect, and/or the seventeenth possible implementation of the second aspect, and/or the eighteenth possible implementation of the second aspect, and/or the nineteenth possible implementation of the second aspect, and/or the twentieth possible implementation of the second aspect, and/or the twenty-first possible implementation of the second aspect, in a twenty-second possible implementation of the second aspect, in the frame structure of the serving cell, each subframe is a subframe of 1 ms, the first special subframe includes 12 symbols used for downlink transmission, a GP whose duration is one symbol, and one symbol used for uplink transmission, and the second special subframe includes one symbol used for downlink transmission, a GP whose duration is one symbol, and 12 symbols used for uplink transmission.

According to a third aspect, an information sending or receiving method is provided, including:

determining, by user equipment, a frame structure of a serving cell, where a radio frame corresponding to the frame structure includes at least one downlink subframe, at least one uplink subframe, and at least one special subframe, the special subframe is a first special subframe or a second special subframe, the at least one downlink subframe includes a subframe 1, the at least one uplink subframe includes a subframe l+4, the at least one special subframe includes a subframe l+5, and the subframe l+5 is the first special subframe, where l is a positive integer, l is an odd multiple of 5, and l is a subframe number; and sending or receiving, by the user equipment, information in the serving cell based on the frame structure, where the special subframe includes a symbol used for downlink transmission, a guard period GP, and a symbol used for uplink transmission, a quantity of symbols used for downlink transmission is greater than a quantity of symbols used for uplink transmission in the first special subframe, a quantity of symbols used for downlink transmission is less than a quantity of symbols used for uplink transmission in the second special subframe, the downlink transmission includes physical downlink control channel transmission, and the uplink transmission includes hybrid automatic repeat request-acknowledgment HARQ-ACK transmission.

With reference to the third aspect, in a first possible implementation of the third aspect, each radio frame corresponding to the frame structure includes 10 subframes, and the second subframe and the seventh subframe in each radio frame are the first special subframes.

With reference to the third aspect and/or the first possible implementation of the third aspect, in a second possible implementation of the third aspect, in the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, where m is an integer, the subframe m is not the second subframe in each radio frame, and m is a subframe number.

With reference to the third aspect, and/or the first possible implementation of the third aspect, and/or the second possible implementation of the third aspect, in a third possible implementation of the third aspect, the determining, by user equipment, a frame structure of a serving cell includes:

determining, by the user equipment, the frame structure of the serving cell according to an uplink-to-downlink ratio of the serving cell, where the following is specifically included:

when the uplink-to-downlink ratio of the serving cell is 1:9, each radio frame corresponding to the frame structure includes 10 subframes, where in each radio frame, the fourth subframe and the sixth subframe are the downlink subframes, the tenth subframe is the uplink subframe, and the first subframe, the second subframe, the third subframe, the fifth subframe, the seventh subframe, the eighth subframe, and the ninth subframe are the first special subframes; or when the uplink-to-downlink ratio of the serving cell is 2:8, each radio frame corresponding to the frame structure includes 10 subframes, where in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3:7, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4:6, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5:5, each radio frame corresponding to the frame structure includes 10 subframes, where in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

With reference to the third aspect, and/or the first possible implementation of the third aspect, and/or the second possible implementation of the third aspect, and/or the third possible implementation of the third aspect, in a fourth possible implementation of the third aspect, the sending or receiving, by the user equipment, information in the serving cell based on the frame structure includes:

receiving, by the user equipment in a subframe n in the serving cell, physical downlink shared channel transmission or a downlink control channel indicating downlink semi-persistent scheduling release, where n is an integer, and n is a subframe number; and sending, by the user equipment in a subframe n+k, an HARQ-ACK corresponding to the physical downlink shared channel transmission or the downlink control channel that is received in the subframe n in the serving cell, where k is an integer, and when the subframe n is corresponding to the second subframe in each radio frame, a value of k is 5; or otherwise, a value of k is 4.

With reference to the third aspect, and/or the first possible implementation of the third aspect, and/or the second possible implementation of the third aspect, and/or the third possible implementation of the third aspect, in a fifth possible implementation of the third aspect, the sending or receiving, by the user equipment, information in the serving cell based on the frame structure includes:

receiving, by the user equipment in a subframe i, a downlink control channel that schedules a physical uplink shared channel; and sending, by the user equipment in a subframe i+4 in the serving cell, the physical uplink shared channel scheduled by the downlink control channel, where i is an integer, and i is a subframe number.

With reference to the third aspect, and/or the first possible implementation of the third aspect, and/or the second possible implementation of the third aspect, and/or the third possible implementation of the third aspect, in a sixth possible implementation of the third aspect, the sending or receiving, by the user equipment, information in the serving cell based on the frame structure includes:

sending, by the user equipment, a physical uplink shared channel in a subframe j in the serving cell; and receiving, by the user equipment in a subframe j+6, an HARQ-ACK corresponding to the physical uplink shared channel, where j is an integer, and j is a subframe number.

With reference to the third aspect, and/or the first possible implementation of the third aspect, and/or the second possible implementation of the third aspect, and/or the third possible implementation of the third aspect, in a seventh possible implementation of the third aspect, the sending or receiving, by the user equipment, information in the serving cell based on the frame structure includes:

receiving, by the user equipment in a subframe h, an HARQ-ACK corresponding to a physical uplink shared channel; and sending, by the user equipment in a subframe h+4 in the serving cell, the physical uplink shared channel corresponding to the HARQ-ACK, where h is an integer, and h is a subframe number.

With reference to the third aspect, in an eighth possible implementation of the third aspect, each radio frame corresponding to the frame structure includes 10 subframes, and the first subframe, the second subframe, and the seventh subframe in each radio frame are the first special subframes.

With reference to the third aspect and/or the eighth possible implementation of the third aspect, in a ninth possible implementation of the third aspect, the determining, by user equipment, a frame structure of a serving cell includes:

determining, by the user equipment, the frame structure of the serving cell according to an uplink-to-downlink ratio of the serving cell, where the following is specifically included:

when the uplink-to-downlink ratio of the serving cell is 1:9, each radio frame includes 10 subframes, where in each radio frame, the sixth subframe is the downlink subframe, the tenth subframe is the uplink subframe, and the first subframe, the second subframe, the third subframe, the fourth subframe, the fifth subframe, the seventh subframe, the eighth subframe, and the ninth subframe are the first special subframes; or when the uplink-to-downlink ratio of the serving cell is 2:8, each radio frame includes 10 subframes, where in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3:7, each radio frame includes 10 subframes, where in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4:6, each radio frame includes 10 subframes, where in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5:5, each radio frame includes 10 subframes, where in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

With reference to the third aspect, and/or the eighth possible implementation of the third aspect, and/or the ninth possible implementation of the third aspect, in a tenth possible implementation of the third aspect, the sending or receiving, by the user equipment, information in the serving cell based on the frame structure includes:

receiving, by the user equipment in a subframe n in the serving cell, physical downlink shared channel transmission or a downlink control channel indicating downlink semi-persistent scheduling release, where n is an integer, and n is a subframe number; and sending, by the user equipment in a subframe n+k, an HARQ-ACK response corresponding to the physical downlink shared channel transmission or the downlink control channel that is received in the subframe n in the serving cell, where k is an integer, and when the subframe n is corresponding to the first subframe in each radio frame, a value of k is 4; or otherwise, a value of k is 5.

With reference to the third aspect, and/or the eighth possible implementation of the third aspect, and/or the ninth possible implementation of the third aspect, in an eleventh possible implementation of the third aspect, the sending or receiving, by the user equipment, information in the serving cell based on the frame structure includes:

receiving, by the user equipment in a subframe i, a downlink control channel that schedules a physical uplink shared channel; and sending, by the user equipment in a subframe i+5 in the serving cell, the physical uplink shared channel scheduled by the downlink control channel, where i is an integer, and i is a subframe number.

With reference to the third aspect, and/or the eighth possible implementation of the third aspect, and/or the ninth possible implementation of the third aspect, in a twelfth possible implementation of the third aspect, the sending or receiving, by the user equipment, information in the serving cell based on the frame structure includes:

sending, by the user equipment, a physical uplink shared channel in a subframe j in the serving cell; and receiving, by the user equipment in a subframe j+5, an HARQ-ACK corresponding to the physical uplink shared channel, where j is an integer, and j is a subframe number.

With reference to the third aspect, and/or the eighth possible implementation of the third aspect, and/or the ninth possible implementation of the third aspect, in a thirteenth possible implementation of the third aspect, the sending or receiving, by the user equipment, information in the serving cell based on the frame structure includes:

receiving, by the user equipment in a subframe h, an HARQ-ACK corresponding to a physical uplink shared channel; and sending, by the user equipment in a subframe h+5 in the serving cell, the physical uplink shared channel corresponding to the HARQ-ACK, where h is an integer, and h is a subframe number.

With reference to the third aspect, in a fourteenth possible implementation of the third aspect, the following is included:

each radio frame corresponding to the frame structure includes 10 subframes, and in each radio frame, the sixth subframe is the downlink subframe, the tenth subframe is the uplink subframe, the first subframe, the second subframe, the third subframe, the fifth subframe, the seventh subframe, and the ninth subframe are the first special subframes, and the fourth subframe and the eighth subframe are the second special subframes.

With reference to the third aspect, in a fifteenth possible implementation of the third aspect, the following is included:

each radio frame corresponding to the frame structure includes 10 subframes, and in each radio frame, the fourth subframe and the sixth subframe are the downlink subframes, the tenth subframe is the uplink subframe, the first subframe, the second subframe, the third subframe, the fifth subframe, the seventh subframe, and the ninth subframe are the first special subframes, and the eighth subframe is the second special subframe.

With reference to the fourteenth possible implementation of the third aspect and/or the fifteenth possible implementation of the third aspect, in a sixteenth possible implementation of the third aspect, the sending or receiving, by the user equipment, information in the serving cell based on the frame structure includes:

receiving, by the user equipment in a subframe i, a downlink control channel that schedules a physical uplink shared channel; and sending, by the user equipment in a subframe i+4 in the serving cell, the physical uplink shared channel scheduled by the downlink control channel, where i is an integer, and i is a subframe number.

With reference to the fourteenth possible implementation of the third aspect and/or the fifteenth possible implementation of the third aspect, in a seventeenth possible implementation of the third aspect, the sending or receiving, by the user equipment, information in the serving cell based on the frame structure includes:

sending, by the user equipment, a physical uplink shared channel in a subframe j in the serving cell; and receiving, by the user equipment in a subframe j+4, an HARQ-ACK corresponding to the physical uplink shared channel, where j is an integer, and j is a subframe number.

With reference to the fourteenth possible implementation of the third aspect and/or the fifteenth possible implementation of the third aspect, in an eighteenth possible implementation of the third aspect, the sending or receiving, by the user equipment, information in the serving cell based on the frame structure includes:

receiving, by the user equipment in a subframe h, an HARQ-ACK corresponding to a physical uplink shared channel; and sending, by the user equipment in a subframe h+4 in the serving cell, the physical uplink shared channel corresponding to the HARQ-ACK, where h is an integer, and h is a subframe number.

With reference to the eighteenth possible implementation of the third aspect, in a nineteenth possible implementation of the third aspect, the sending, by the user equipment in a subframe h+4 in the serving cell, the physical uplink shared channel corresponding to the HARQ-ACK includes:

if the subframe h+4 is the downlink subframe or the first special subframe, sending, by the user equipment in a subframe h+4+8×a in the serving cell, the physical uplink shared channel corresponding to the HARQ-ACK, where a is a positive integer greater than or equal to 1, and the subframe h+4+8×a is the first available uplink subframe or second special subframe.

With reference to the third aspect, and/or the first possible implementation of the third aspect, and/or the second possible implementation of the third aspect, and/or the third possible implementation of the third aspect, and/or the fourth possible implementation of the third aspect, and/or the fifth possible implementation of the third aspect, and/or the sixth possible implementation of the third aspect, and/or the seventh possible implementation of the third aspect, and/or the eighth possible implementation of the third aspect, and/or the ninth possible implementation of the third aspect, and/or the tenth possible implementation of the third aspect, and/or the eleventh possible implementation of the third aspect, and/or the twelfth possible implementation of the third aspect, and/or the thirteenth possible implementation of the third aspect, and/or the fourteenth possible implementation of the third aspect, and/or the fifteenth possible implementation of the third aspect, and/or the sixteenth possible implementation of the third aspect, and/or the seventeenth possible implementation of the third aspect, and/or the eighteenth possible implementation of the third aspect, and/or the nineteenth possible implementation of the third aspect, in a twentieth possible implementation of the third aspect, if the user equipment is legacy user equipment, an uplink-downlink configuration that is of the serving cell and is configured for the user equipment is an uplink-downlink configuration 0.

With reference to the third aspect, and/or the first possible implementation of the third aspect, and/or the second possible implementation of the third aspect, and/or the third possible implementation of the third aspect, and/or the fourth possible implementation of the third aspect, and/or the fifth possible implementation of the third aspect, and/or the sixth possible implementation of the third aspect, and/or the seventh possible implementation of the third aspect, and/or the eighth possible implementation of the third aspect, and/or the ninth possible implementation of the third aspect, and/or the tenth possible implementation of the third aspect, and/or the eleventh possible implementation of the third aspect, and/or the twelfth possible implementation of the third aspect, and/or the thirteenth possible implementation of the third aspect, and/or the fourteenth possible implementation of the third aspect, and/or the fifteenth possible implementation of the third aspect, and/or the sixteenth possible implementation of the third aspect, and/or the seventeenth possible implementation of the third aspect, and/or the eighteenth possible implementation of the third aspect, and/or the nineteenth possible implementation of the third aspect, and/or the twentieth possible implementation of the third aspect, in a twenty-first possible implementation of the third aspect, if the user equipment is legacy user equipment, the sending or receiving, by the user equipment, information in the serving cell based on the frame structure includes:

sending or receiving, by the user equipment, information in the serving cell based on the frame structure and according to HARQ timing in LTE release 8.

With reference to the third aspect, and/or the first possible implementation of the third aspect, and/or the second possible implementation of the third aspect, and/or the third possible implementation of the third aspect, and/or the fourth possible implementation of the third aspect, and/or the fifth possible implementation of the third aspect, and/or the sixth possible implementation of the third aspect, and/or the seventh possible implementation of the third aspect, and/or the eighth possible implementation of the third aspect, and/or the ninth possible implementation of the third aspect, and/or the tenth possible implementation of the third aspect, and/or the eleventh possible implementation of the third aspect, and/or the twelfth possible implementation of the third aspect, and/or the thirteenth possible implementation of the third aspect, and/or the fourteenth possible implementation of the third aspect, and/or the fifteenth possible implementation of the third aspect, and/or the sixteenth possible implementation of the third aspect, and/or the seventeenth possible implementation of the third aspect, and/or the eighteenth possible implementation of the third aspect, and/or the nineteenth possible implementation of the third aspect, and/or the twentieth possible implementation of the third aspect, and/or the twenty-first possible implementation of the third aspect, in a twenty-second possible implementation of the third aspect, in the frame structure of the serving cell, each subframe is a subframe of 1 ms, the first special subframe includes 12 symbols used for downlink transmission, a GP whose duration is one symbol, and one symbol used for uplink transmission, and the second special subframe includes one symbol used for downlink transmission, a GP whose duration is one symbol, and 12 symbols used for uplink transmission.

According to a fourth aspect, an information sending or receiving method is provided, including:

determining, by a base station, a frame structure of a serving cell, where each radio frame corresponding to the frame structure includes at least one downlink subframe, at least one uplink subframe, and at least one special subframe, the special subframe is a first special subframe or a second special subframe, the at least one downlink subframe includes a subframe l, the at least one uplink subframe includes a subframe l+4, the at least one special subframe includes a subframe l+5, and the subframe l+5 is the first special subframe, where l is an integer, l is an odd multiple of 5, and l is a subframe number; and sending, by the base station, information to or receiving information from user equipment in the serving cell based on the frame structure, where the special subframe includes a time domain symbol used for downlink transmission, a guard period GP, and a time domain symbol used for uplink transmission, a quantity of time domain symbols used for downlink transmission is greater than a quantity of time domain symbols used for uplink transmission in the first special subframe, a quantity of time domain symbols used for downlink transmission is less than a quantity of time domain symbols used for uplink transmission in the second special subframe, the downlink transmission includes physical downlink control channel transmission, and the uplink transmission includes hybrid automatic repeat request-acknowledgment HARQ-ACK transmission.

With reference to the fourth aspect, in a first possible implementation of the fourth aspect, each radio frame corresponding to the frame structure includes 10 subframes, and the second subframe and the seventh subframe in each radio frame are the first special subframes.

With reference to the fourth aspect and/or the first possible implementation of the fourth aspect, in a second possible implementation of the fourth aspect, in the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, where m is an integer, the subframe m is not the second subframe in each radio frame, and m is a subframe number.

With reference to the fourth aspect, and/or the first possible implementation of the fourth aspect, and/or the second possible implementation of the fourth aspect, in a third possible implementation of the fourth aspect, the determining, by a base station, a frame structure of a serving cell includes:

determining, by the base station, the frame structure of the serving cell according to an uplink-to-downlink ratio of the serving cell, where the following is specifically included:

when the uplink-to-downlink ratio of the serving cell is 1:9, each radio frame corresponding to the frame structure includes 10 subframes, where in each radio frame, the fourth subframe and the sixth subframe are the downlink subframes, the tenth subframe is the uplink subframe, and the first subframe, the second subframe, the third subframe, the fifth subframe, the seventh subframe, the eighth subframe, and the ninth subframe are the first special subframes; or when the uplink-to-downlink ratio of the serving cell is 2:8, each radio frame corresponding to the frame structure includes 10 subframes, where in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3:7, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4:6, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5:5, each radio frame corresponding to the frame structure includes 10 subframes, where in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

With reference to the fourth aspect, and/or the first possible implementation of the fourth aspect, and/or the second possible implementation of the fourth aspect, and/or the third possible implementation of the fourth aspect, in a fourth possible implementation of the fourth aspect, the sending, by the base station, information to or receiving information from user equipment in the serving cell based on the frame structure includes:

sending, by the base station to the user equipment in a subframe n in the serving cell, physical downlink shared channel transmission or a downlink control channel indicating downlink semi-persistent scheduling release, where n is an integer, and n is a subframe number; and receiving, by the base station in a subframe n+k, an HARQ-ACK response that is fed back by the user equipment and is corresponding to the physical downlink shared channel transmission or the downlink control channel that is sent in the subframe n in the serving cell, where k is an integer, and when the subframe n is corresponding to the second subframe in each radio frame, a value of k is 5; or otherwise, a value of k is 4.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, in a fifth possible implementation of the fourth aspect, the sending, by the base station, information to or receiving information from user equipment in the serving cell based on the frame structure includes:

sending, by the base station to the user equipment in a subframe i, a downlink control channel that schedules a physical uplink shared channel; and receiving, by the base station in a subframe i+4 in the serving cell, the physical uplink shared channel scheduled by the downlink control channel, where i is an integer, and i is a subframe number.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, in a sixth possible implementation of the fourth aspect, the sending, by the base station, information to or receiving information from user equipment in the serving cell based on the frame structure includes:

receiving, by the base station in a subframe j in the serving cell, a physical uplink shared channel sent by the user equipment; and sending, by the base station in a subframe j+6, an HARQ-ACK corresponding to the physical uplink shared channel, where j is an integer, and j is a subframe number.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, in a seventh possible implementation of the fourth aspect, the sending, by the base station, information to or receiving information from user equipment in the serving cell based on the frame structure includes:

sending, by the base station in a subframe h, an HARQ-ACK corresponding to a physical uplink shared channel sent by the user equipment; and receiving, by the base station, retransmission of the physical uplink shared channel in a subframe h+4 in the serving cell, where h is an integer, and h is a subframe number.

With reference to the fourth aspect, in an eighth possible implementation of the fourth aspect, each radio frame corresponding to the frame structure includes 10 subframes, and the first subframe, the second subframe, and the seventh subframe in each radio frame are the first special subframes.

With reference to the fourth aspect and/or the eighth possible implementation of the fourth aspect, in a ninth possible implementation of the fourth aspect, the determining, by a base station, a frame structure of a serving cell includes:

determining, by the base station, the frame structure of the serving cell according to an uplink-to-downlink ratio of the serving cell, where the following is specifically included:

when the uplink-to-downlink ratio of the serving cell is 1:9, each radio frame includes 10 subframes, where in each radio frame, the sixth subframe is the downlink subframe, the tenth subframe is the uplink subframe, and the first subframe, the second subframe, the third subframe, the fourth subframe, the fifth subframe, the seventh subframe, the eighth subframe, and the ninth subframe are the first special subframes; or when the uplink-to-downlink ratio of the serving cell is 2:8, each radio frame includes 10 subframes, where in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3:7, each radio frame includes 10 subframes, where in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4:6, each radio frame includes 10 subframes, where in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5:5, each radio frame includes 10 subframes, where in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

With reference to the fourth aspect, and/or the eighth possible implementation of the fourth aspect, and/or the ninth possible implementation of the fourth aspect, in a tenth possible implementation of the fourth aspect, the sending, by the base station, information to or receiving information from user equipment in the serving cell based on the frame structure includes:

sending, by the base station to the user equipment in a subframe n in the serving cell, physical downlink shared channel transmission or a downlink control channel indicating downlink semi-persistent scheduling release, where n is an integer, and n is a subframe number; and receiving, by the base station in a subframe n+k, a hybrid automatic repeat request-acknowledgment HARQ-ACK response that is fed back by the user equipment and is corresponding to the physical downlink shared channel transmission or the downlink control channel that is sent in the subframe n in the serving cell, where k is an integer, and when the subframe n is corresponding to the first subframe in each radio frame, a value of k is 4; or otherwise, a value of k is 5.

With reference to the fourth aspect, and/or the eighth possible implementation of the fourth aspect, and/or the ninth possible implementation of the fourth aspect, in an eleventh possible implementation of the fourth aspect, the sending, by the base station, information to or receiving information from user equipment in the serving cell based on the frame structure includes:

sending, by the base station to the user equipment in a subframe i, a downlink control channel that schedules a physical uplink shared channel; and receiving, by the base station in a subframe i+5 in the serving cell, the physical uplink shared channel scheduled by the downlink control channel, where i is an integer, and i is a subframe number.

With reference to the fourth aspect, and/or the eighth possible implementation of the fourth aspect, and/or the ninth possible implementation of the fourth aspect, in a twelfth possible implementation of the fourth aspect, the sending, by the base station, information to or receiving information from user equipment in the serving cell based on the frame structure includes:

receiving, by the base station in a subframe j in the serving cell, a physical uplink shared channel sent by the user equipment; and sending, by the base station in a subframe j+5, an HARQ-ACK corresponding to the physical uplink shared channel, where j is an integer, and j is a subframe number.

With reference to the fourth aspect, and/or the eighth possible implementation of the fourth aspect, and/or the ninth possible implementation of the fourth aspect, in a thirteenth possible implementation of the fourth aspect, the sending, by the base station, information to or receiving information from user equipment in the serving cell based on the frame structure includes:

sending, by the base station in a subframe h, an HARQ-ACK corresponding to a physical uplink shared channel sent by the user equipment; and receiving, by the base station, retransmission of the physical uplink shared channel in a subframe h+5 in the serving cell, where h is an integer, and h is a subframe number.

With reference to the fourth aspect, in a fourteenth possible implementation of the fourth aspect, the following is included:

each radio frame corresponding to the frame structure includes 10 subframes, and in each radio frame, the sixth subframe is the downlink subframe, the tenth subframe is the uplink subframe, the first subframe, the second subframe, the third subframe, the fifth subframe, the seventh subframe, and the ninth subframe are the first special subframes, and the fourth subframe and the eighth subframe are the second special subframes.

With reference to the fourth aspect, in a fifteenth possible implementation of the fourth aspect, the following is included:

each radio frame corresponding to the frame structure includes 10 subframes, and in each radio frame, the fourth subframe and the sixth subframe are the downlink subframes, the tenth subframe is the uplink subframe, the first subframe, the second subframe, the third subframe, the fifth subframe, the seventh subframe, and the ninth subframe are the first special subframes, and the eighth subframe is the second special subframe.

With reference to the fourteenth possible implementation of the fourth aspect and/or the fifteenth possible implementation of the fourth aspect, in a sixteenth possible implementation of the fourth aspect, the sending, by the base station, information to or receiving information from user equipment in the serving cell based on the frame structure includes:

sending, by the base station to the user equipment in a subframe i, a downlink control channel that schedules a physical uplink shared channel; and receiving, by the base station in a subframe i+4 in the serving cell, the physical uplink shared channel scheduled by the downlink control channel, where i is an integer, and i is a subframe number.

With reference to the fourteenth possible implementation of the fourth aspect and/or the fifteenth possible implementation of the fourth aspect, in a seventeenth possible implementation of the fourth aspect, the sending, by the base station, information to or receiving information from user equipment in the serving cell based on the frame structure includes:

receiving, by the base station in a subframe j in the serving cell, a physical uplink shared channel sent by the user equipment; and sending, by the base station in a subframe j+4, an HARQ-ACK corresponding to the physical uplink shared channel, where j is an integer, and j is a subframe number.

With reference to the fourteenth possible implementation of the fourth aspect and/or the fifteenth possible implementation of the fourth aspect, in an eighteenth possible implementation of the fourth aspect, the sending, by the base station, information to or receiving information from user equipment in the serving cell based on the frame structure includes:

sending, by the base station in a subframe h, an HARQ-ACK corresponding to a physical uplink shared channel sent by the user equipment; and receiving, by the base station, retransmission of the physical uplink shared channel in a subframe h+4 in the serving cell, where h is an integer, and h is a subframe number.

With reference to the fourth aspect, in a nineteenth possible implementation of the fourth aspect, the receiving, by the base station, retransmission of the physical uplink shared channel in a subframe h+4 in the serving cell includes:

if the subframe h+4 is the downlink subframe or the first special subframe, receiving, by the base station, retransmission of the physical uplink shared channel in a subframe h+4+8×a in the serving cell, where a is a positive integer greater than or equal to 1, and the subframe h+4+8×a is the first available uplink subframe or second special subframe.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, and/or the fifth possible implementation of the fourth aspect, and/or the sixth possible implementation of the fourth aspect, and/or the seventh possible implementation of the fourth aspect, and/or the eighth possible implementation of the fourth aspect, and/or the ninth possible implementation of the fourth aspect, and/or the tenth possible implementation of the fourth aspect, and/or the eleventh possible implementation of the fourth aspect, and/or the twelfth possible implementation of the fourth aspect, and/or the thirteenth possible implementation of the fourth aspect, and/or the fourteenth possible implementation of the fourth aspect, and/or the fifteenth possible implementation of the fourth aspect, and/or the sixteenth possible implementation of the fourth aspect, and/or the seventeenth possible implementation of the fourth aspect, and/or the eighteenth possible implementation of the fourth aspect, and/or the nineteenth possible implementation of the fourth aspect, in a twentieth possible implementation of the fourth aspect, if the user equipment is legacy user equipment, the uplink-to-downlink ratio that is of the serving cell and is configured by the base station for the user equipment is an uplink-to-downlink ratio 0.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, and/or the fifth possible implementation of the fourth aspect, and/or the sixth possible implementation of the fourth aspect, and/or the seventh possible implementation of the fourth aspect, and/or the eighth possible implementation of the fourth aspect, and/or the ninth possible implementation of the fourth aspect, and/or the tenth possible implementation of the fourth aspect, and/or the eleventh possible implementation of the fourth aspect, and/or the twelfth possible implementation of the fourth aspect, and/or the thirteenth possible implementation of the fourth aspect, and/or the fourteenth possible implementation of the fourth aspect, and/or the fifteenth possible implementation of the fourth aspect, and/or the sixteenth possible implementation of the fourth aspect, and/or the seventeenth possible implementation of the fourth aspect, and/or the eighteenth possible implementation of the fourth aspect, and/or the nineteenth possible implementation of the fourth aspect, and/or the twentieth possible implementation of the fourth aspect, in a twenty-first possible implementation of the fourth aspect, the sending, by the base station, information to or receiving information from user equipment in the serving cell based on the frame structure includes:

sending, by the base station, information to or receiving information from the user equipment in the serving cell based on the frame structure and according to HARQ timing in LTE release 8.

With reference to the fourth aspect, and/or the first possible implementation of the fourth aspect, and/or the second possible implementation of the fourth aspect, and/or the third possible implementation of the fourth aspect, and/or the fourth possible implementation of the fourth aspect, and/or the fifth possible implementation of the fourth aspect, and/or the sixth possible implementation of the fourth aspect, and/or the seventh possible implementation of the fourth aspect, and/or the eighth possible implementation of the fourth aspect, and/or the ninth possible implementation of the fourth aspect, and/or the tenth possible implementation of the fourth aspect, and/or the eleventh possible implementation of the fourth aspect, and/or the twelfth possible implementation of the fourth aspect, and/or the thirteenth possible implementation of the fourth aspect, and/or the fourteenth possible implementation of the fourth aspect, and/or the fifteenth possible implementation of the fourth aspect, and/or the sixteenth possible implementation of the fourth aspect, and/or the seventeenth possible implementation of the fourth aspect, and/or the eighteenth possible implementation of the fourth aspect, and/or the nineteenth possible implementation of the fourth aspect, and/or the twentieth possible implementation of the fourth aspect, and/or the twenty-first possible implementation of the fourth aspect, in a twenty-second possible implementation of the fourth aspect, in the frame structure of the serving cell, each subframe is a subframe of 1 ms, the first special subframe includes 12 symbols used for downlink transmission, a GP whose duration is one symbol, and one symbol used for uplink transmission, and the second special subframe includes one symbol used for downlink transmission, a GP whose duration is one symbol, and 12 symbols used for uplink transmission.

In the embodiments of the present application, the user equipment includes the processor and the transceiver. The processor is configured to determine the frame structure of the serving cell. The radio frame corresponding to the frame structure includes the at least one downlink subframe, the at least one uplink subframe, and the at least one special subframe. The special subframe is the first special subframe or the second special subframe. The at least one downlink subframe includes the subframe 1. The at least one uplink subframe includes the subframe l+4. The at least one special subframe includes the subframe l+5, and the subframe l+5 is the first special subframe, where/is a positive integer, and l is an odd multiple of 5. The transceiver is configured to send or receive information in the serving cell based on the frame structure determined by the processor. The special subframe includes the symbol used for downlink transmission, the guard period GP, and the symbol used for uplink transmission. The quantity of symbols used for downlink transmission is greater than the quantity of symbols used for uplink transmission in the first special subframe. The quantity of symbols used for downlink transmission is less than the quantity of symbols used for uplink transmission in the second special subframe. The downlink transmission includes physical downlink control channel transmission. The uplink transmission includes HARQ-ACK transmission. Therefore, same HARQ timing is used for different uplink-downlink configurations, and compared with a frame structure type 2 in an existing LTE release, implementation complexity and protocol complexity of a TDD system are reduced.

BRIEF DESCRIPTION OF DRAWINGS

To describe the technical solutions in the embodiments of the present application more clearly, the following briefly describes the accompanying drawings required for describing the embodiments. Apparently, a person of ordinary skill in the art may still derive other drawings from these accompanying drawings without creative efforts.

DESCRIPTION OF EMBODIMENTS

To make a person skilled in the art understand the technical solutions in the embodiments of the present application better, and make the objectives, features, and advantages of the embodiments of the present application clearer, the following further describes the technical solutions in the embodiments of the present application in detail with reference to the accompanying drawings.

Figure 1:
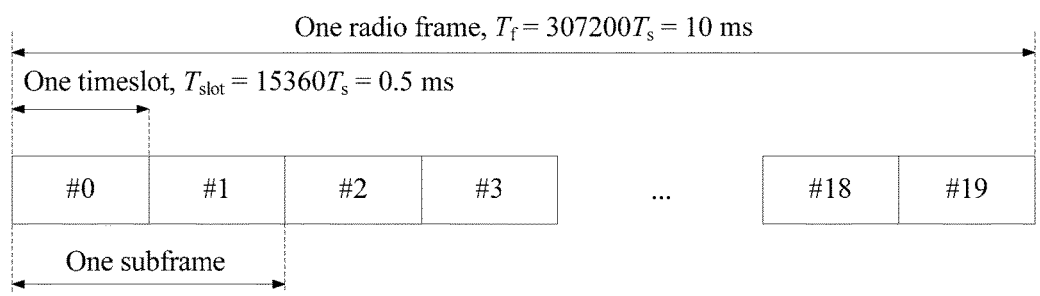
FIG. 1 is a schematic diagram of a frame structure type 1 according to the prior art.
Figure 2:
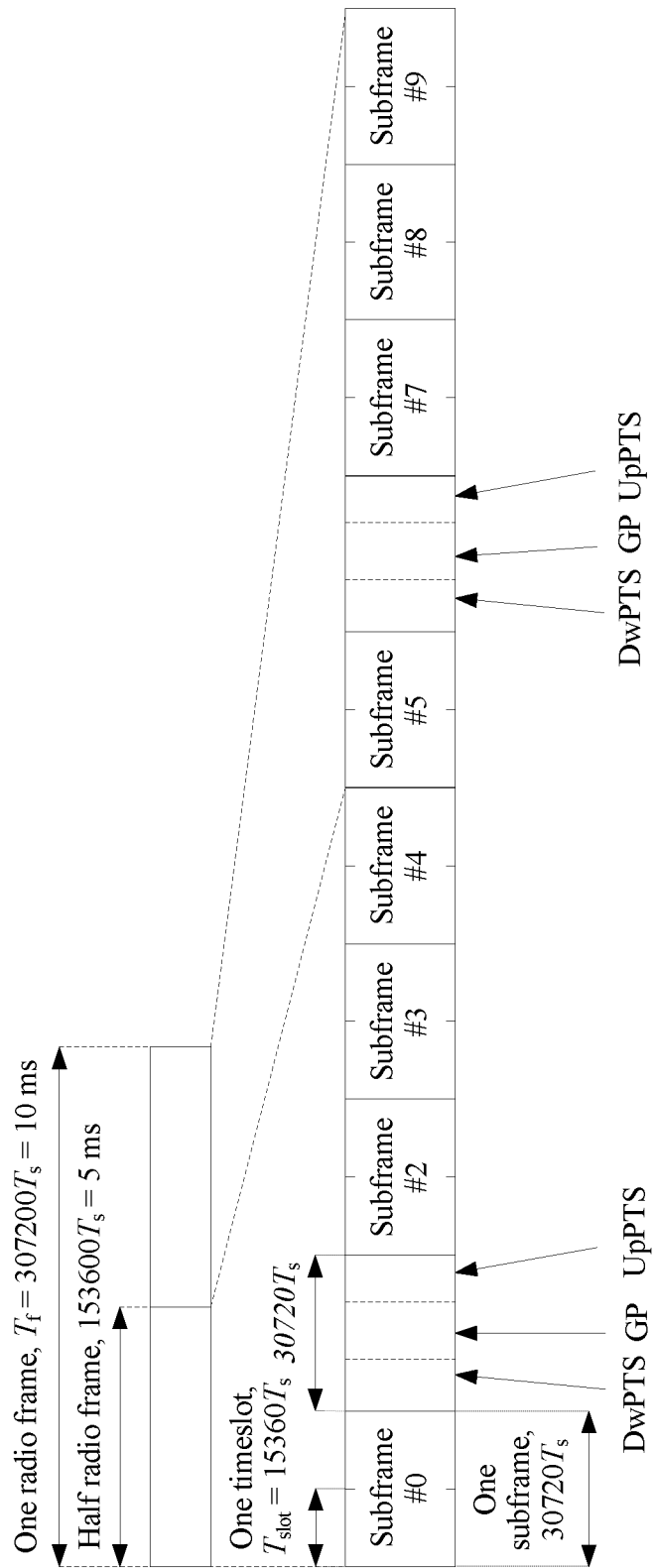
FIG. 2 is a schematic diagram of a frame structure type 2 according to the prior art.
Figure 3:
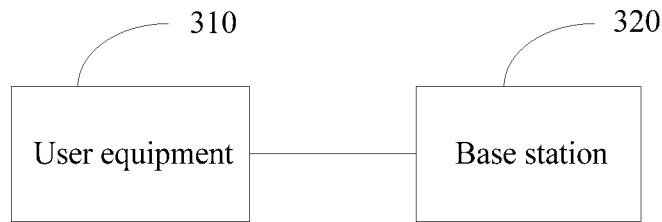
FIG. 3 is a schematic diagram of an example of an application architecture according to an embodiment of the present invention.

FIG. 3 is an example of a network architecture to which an information sending or receiving method according to an embodiment of the present invention can be applied. Referring to FIG. 3, the information sending or receiving method in this embodiment of the present invention is applicable to information transmission between user equipment 310 and a base station 320.

Figure 4:
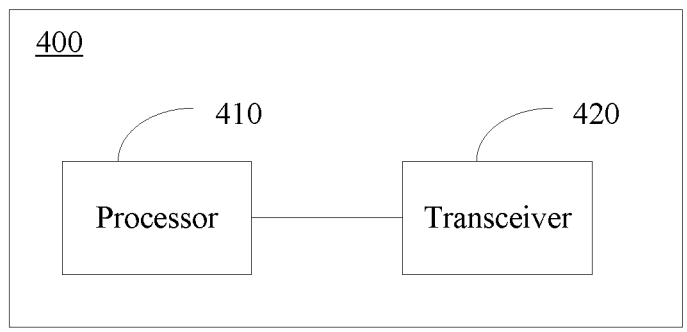
FIG. 4 is a schematic structural diagram of user equipment according to an embodiment of the present invention.

Referring to FIG. 4, FIG. 4 is a schematic structural diagram of user equipment according to an embodiment of the present invention. The user equipment 400 includes a processor 410 and a transceiver 420.

The processor 410 is configured to determine a frame structure of a serving cell. A radio frame corresponding to the frame structure includes at least one downlink subframe, at least one uplink subframe, and at least one special subframe. The special subframe is a first special subframe or a second special subframe. The at least one downlink subframe includes a subframe l. The at least one uplink subframe includes a subframe l+4. The at least one special subframe includes a subframe l+5, and the subframe l+5 is the first special subframe, where l is a positive integer, l is an odd multiple of 5, and l is a subframe number.

It should be noted that in embodiments of the present invention, the subframe number is a number of a subframe in multiple radio frames, and may be obtained in the following manner: Subframes in multiple radio frames are numbered from 0 according to a time sequence in a monotonically increasing manner. That is, if a number of the last subframe in a previous radio frame is n', a number of the first subframe in a current radio frame is n'+1.

The transceiver 420 is configured to send or receive information in the serving cell based on the frame structure determined by the processor 410.

The special subframe includes a symbol used for downlink transmission, a guard period GP, and a symbol used for uplink transmission. A quantity of symbols used for downlink transmission is greater than a quantity of symbols used for uplink transmission in the first special subframe. A quantity of symbols used for downlink transmission is less than a quantity of symbols used for uplink transmission in the second special subframe. The downlink transmission includes physical downlink control channel transmission. The uplink transmission includes hybrid automatic repeat request-acknowledgment HARQ-ACK transmission.

Each radio frame corresponding to the frame structure may include 10 subframes, and the second subframe and the seventh subframe in each radio frame are the first special subframes.

In some embodiments, in the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, where m is an integer, the subframe m is not the second subframe in each radio frame, and m is a subframe number.

In some embodiments, the processor may be further configured to:
determine the frame structure of the serving cell according to an uplink-to-downlink ratio of the serving cell, where the following is specifically included:

When the uplink-to-downlink ratio of the serving cell is 1:9, each radio frame corresponding to the frame structure includes 10 subframes, where in each radio frame, the fourth subframe and the sixth subframe are the downlink subframes, the tenth subframe is the uplink subframe, and the first subframe, the second subframe, the third subframe, the fifth subframe, the seventh subframe, the eighth subframe, and the ninth subframe are the first special subframes; or when the uplink-to-downlink ratio of the serving cell is 2:8, each radio frame corresponding to the frame structure includes 10 subframes, where in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3:7, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4:6, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5:5, each radio frame corresponding to the frame structure includes 10 subframes, where in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

In some embodiments, the transceiver may be further configured to:
receive, in a subframe n in the serving cell, physical downlink shared channel transmission or a downlink control channel indicating downlink semi-persistent scheduling release, where n is an integer, and n is a subframe number; and
send, in a subframe n+k, an HARQ-ACK corresponding to the physical downlink shared channel transmission or the downlink control channel that is received in the subframe n in the serving cell, where k is an integer.

When the subframe n is corresponding to the second subframe in each radio frame, a value of k is 5; or otherwise, a value of k is 4.

In some embodiments, the transceiver may be further configured to:
receive, in a subframe i, a downlink control channel that schedules a physical uplink shared channel; and
send, in a subframe i+4 in the serving cell, the physical uplink shared channel scheduled by the downlink control channel, where i is an integer, and i is a subframe number.

In some embodiments, the transceiver may be further configured to:
send a physical uplink shared channel in a subframe j in the serving cell; and
receive, in a subframe j+6, an HARQ-ACK corresponding to the physical uplink shared channel, where j is an integer, and j is a subframe number.

In some embodiments, the transceiver may be further configured to:

receive, in a subframe h, an HARQ-ACK corresponding to a physical uplink shared channel; and send, in a subframe h+4 in the serving cell, the physical uplink shared channel corresponding to the HARQ-ACK, where h is an integer, and h is a subframe number.

Each radio frame corresponding to the frame structure may include 10 subframes, and the first subframe, the second subframe, and the seventh subframe in each radio frame are the first special subframes.

In some embodiments, the processor may be further configured to:

determine the frame structure of the serving cell according to an uplink-to-downlink ratio of the serving cell, where the following is specifically included:

When the uplink-to-downlink ratio of the serving cell is 1:9, each radio frame includes 10 subframes, where in each radio frame, the sixth subframe is the downlink subframe, the tenth subframe is the uplink subframe, and the first subframe, the second subframe, the third subframe, the fourth subframe, the fifth subframe, the seventh subframe, the eighth subframe, and the ninth subframe are the first special subframes; or when the uplink-to-downlink ratio of the serving cell is 2:8, each radio frame includes 10 subframes, where in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3:7, each radio frame includes 10 subframes, where in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4:6, each radio frame includes 10 subframes, where in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5:5, each radio frame includes 10 subframes, where in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

In some embodiments, the transceiver may be further configured to:

receive, in a subframe n in the serving cell, physical downlink shared channel transmission or a downlink control channel indicating downlink semi-persistent scheduling release, where n is an integer, and n is a subframe number; and send, in a subframe n+k, an HARQ-ACK response corresponding to the physical downlink shared channel transmission or the downlink control channel that is received in the subframe n in the serving cell, where k is an integer, and n is a subframe number.

When the subframe n is corresponding to the first subframe in each radio frame, a value of k is 4; or otherwise, a value of k is 5.

In some embodiments, the transceiver may be further configured to:

receive, in a subframe i, a downlink control channel that schedules a physical uplink shared channel; and send, in a subframe i+5 in the serving cell, the physical uplink shared channel scheduled by the downlink control channel, where i is an integer, and i is a subframe number.

In some embodiments, the transceiver may be further configured to:

send a physical uplink shared channel in a subframe j in the serving cell; and receive, in a subframe j+5, an HARQ-ACK corresponding to the physical uplink shared channel, where j is an integer, and j is a subframe number.

In some embodiments, the transceiver may be further configured to:

receive, in a subframe h, an HARQ-ACK corresponding to a physical uplink shared channel; and send, in a subframe h+5 in the serving cell, the physical uplink shared channel corresponding to the HARQ-ACK, where h is an integer, and h is a subframe number.

Each radio frame corresponding to the frame structure may include 10 subframes, and in each radio frame, the sixth subframe is the downlink subframe, the tenth subframe is the uplink subframe, the first subframe, the second subframe, the third subframe, the fifth subframe, the seventh subframe, and the ninth subframe are the first special subframes, and the fourth subframe and the eighth subframe are the second special subframes. Alternatively, each radio frame corresponding to the frame structure may include 10 subframes, and in each radio frame, the fourth subframe and the sixth subframe are the downlink subframes, the tenth subframe is the uplink subframe, the first subframe, the second subframe, the third subframe, the fifth subframe, the seventh subframe, and the ninth subframe are the first special subframes, and the eighth subframe is the second special subframe.

In some embodiments, the transceiver may be further configured to:

receive, in a subframe i, a downlink control channel that schedules a physical uplink shared channel; and send, in a subframe i+4 in the serving cell, the physical uplink shared channel scheduled by the downlink control channel, where i is an integer, and i is a subframe number.

In some embodiments, the transceiver may be further configured to:

send a physical uplink shared channel in a subframe j in the serving cell; and receive, in a subframe j+4, an HARQ-ACK corresponding to the physical uplink shared channel, where j is an integer, and j is a subframe number.

In some embodiments, the transceiver may be further configured to:

receive, in a subframe h, an HARQ-ACK corresponding to a physical uplink shared channel; and send, in a subframe h+4 in the serving cell, the physical uplink shared channel corresponding to the HARQ-ACK, where h is an integer, and h is a subframe number.

In some embodiments, the transceiver may be further configured to:

if the subframe h+4 is the downlink subframe or the first special subframe, send, in a subframe h+4+8×a in the serving cell, the physical uplink shared channel corresponding to the HARQ-ACK, where a is a positive integer greater than or equal to 1, and the subframe h+4+8×a is the first available uplink subframe or second special subframe.

If the user equipment is legacy user equipment, an uplink-downlink configuration of the serving cell for the user equipment is an uplink-downlink configuration 0.

If the user equipment is legacy user equipment, the transceiver is further configured to:
  send or receive information in the serving cell based on the frame structure and according to HARQ timing in LTE release 8.

In the frame structure of the serving cell, each subframe is a subframe of 1 ms, the first special subframe includes 12 symbols used for downlink transmission, a GP whose duration is one symbol, and one symbol used for uplink transmission, and the second special subframe includes one symbol used for downlink transmission, a GP whose duration is one symbol, and 12 symbols used for uplink transmission.

In this embodiment, the user equipment determines the frame structure of the serving cell. The radio frame corresponding to the frame structure includes the at least one downlink subframe, the at least one uplink subframe, and the at least one special subframe. The special subframe is the first special subframe or the second special subframe. The at least one downlink subframe includes the subframe l. The at least one uplink subframe includes the subframe l+4. The at least one special subframe includes the subframe l+5, and the subframe l+5 is the first special subframe, where l is a positive integer, and l is an odd multiple of 5. The user equipment sends or receives information in the serving cell based on the frame structure. The special subframe includes the symbol used for downlink transmission, the guard period GP, and the symbol used for uplink transmission. The quantity of symbols used for downlink transmission is greater than the quantity of symbols used for uplink transmission in the first special subframe. The quantity of symbols used for downlink transmission is less than the quantity of symbols used for uplink transmission in the second special subframe. The downlink transmission includes physical downlink control channel transmission. The uplink transmission includes hybrid automatic repeat request-acknowledgment HARQ-ACK transmission. Therefore, same HARQ timing is used for different uplink-downlink configurations, and compared with a frame structure type 2 in an existing LTE release, implementation complexity and protocol complexity of a TDD system are reduced.

Figure 5:
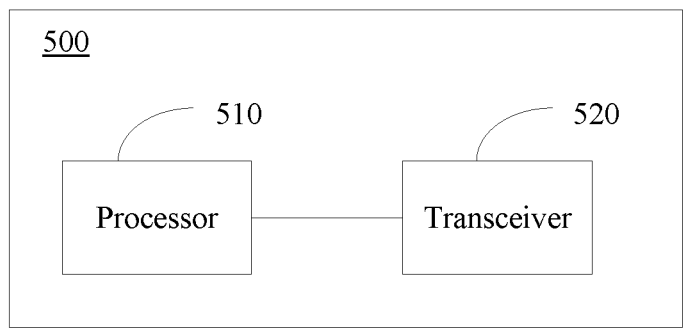
FIG. 5 is a schematic structural diagram of a base station according to an embodiment of the present invention.

Referring to FIG. 5, FIG. 5 is a schematic structural diagram of implementation of a base station according to an embodiment of the present invention. The base station 500 includes a processor 510 and a transceiver 520.

The processor 510 is configured to determine a frame structure of a serving cell. Each radio frame corresponding to the frame structure includes at least one downlink subframe, at least one uplink subframe, and at least one special subframe. The special subframe is a first special subframe or a second special subframe. The at least one downlink subframe includes a subframe l. The at least one uplink subframe includes a subframe l+4. The at least one special subframe includes a subframe l+5, and the subframe l+5 is the first special subframe, where l is an integer, l is an odd multiple of 5, and l is a subframe number.

The transceiver 520 is configured to send information to or receive information from user equipment in the serving cell based on the frame structure determined by the processor 510.

The special subframe includes a time domain symbol used for downlink transmission, a guard period GP, and a time domain symbol used for uplink transmission. A quantity of time domain symbols used for downlink transmission is greater than a quantity of time domain symbols used for uplink transmission in the first special subframe. A quantity of time domain symbols used for downlink transmission is less than a quantity of time domain symbols used for uplink transmission in the second special subframe. The downlink transmission includes physical downlink control channel transmission. The uplink transmission includes hybrid automatic repeat request-acknowledgment HARQ-ACK transmission.

Each radio frame corresponding to the frame structure may include 10 subframes, and the second subframe and the seventh subframe in each radio frame are the first special subframes.

In some embodiments, in the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, where m is an integer, and the subframe m is not the second subframe in each radio frame.

In some embodiments, the processor may be further configured to:

determine the frame structure of the serving cell according to an uplink-to-downlink ratio of the serving cell, where the following is specifically included:

When the uplink-to-downlink ratio of the serving cell is 1:9, each radio frame corresponding to the frame structure includes 10 subframes, where in each radio frame, the fourth subframe and the sixth subframe are the downlink subframes, the tenth subframe is the uplink subframe, and the first subframe, the second subframe, the third subframe, the fifth subframe, the seventh subframe, the eighth subframe, and the ninth subframe are the first special subframes; or when the uplink-to-downlink ratio of the serving cell is 2:8, each radio frame corresponding to the frame structure includes 10 subframes, where in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3:7, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4:6, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5:5, each radio frame corresponding to the frame structure includes 10 subframes, where in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

In some embodiments, the transceiver may be further configured to:

send, to the user equipment in a subframe n in the serving cell, physical downlink shared channel transmission or a downlink control channel indicating downlink semi-persistent scheduling release, where n is an integer, and n is a subframe number; and receive, in a subframe n+k, an HARQ-ACK response that is fed back by the user equipment and is corresponding to the physical downlink shared channel transmission or the downlink control channel that is sent in the subframe n in the serving cell, where k is an integer.

When the subframe n is corresponding to the second subframe in each radio frame, a value of k is 5; or otherwise, a value of k is 4.

In some embodiments, the transceiver may be further configured to:

send, to the user equipment in a subframe i, a downlink control channel that schedules a physical uplink shared channel; and receive, in a subframe i+4 in the serving cell, the physical uplink shared channel scheduled by the downlink control channel, where i is an integer, and i is a subframe number.

In some embodiments, the transceiver may be further configured to:

receive, in a subframe j in the serving cell, a physical uplink shared channel sent by the user equipment; and send, in a subframe j+6, an HARQ-ACK corresponding to the physical uplink shared channel, where j is an integer, and j is a subframe number.

In some embodiments, the transceiver may be further configured to:

send, in a subframe h, an HARQ-ACK corresponding to a physical uplink shared channel sent by the user equipment; and receive retransmission of the physical uplink shared channel in a subframe h+4 in the serving cell, where h is an integer, and h is a subframe number.

Each radio frame corresponding to the frame structure may include 10 subframes, and the first subframe, the second subframe, and the seventh subframe in each radio frame are the first special subframes.

In some embodiments, the processor is further configured to:

determine the frame structure of the serving cell according to an uplink-to-downlink ratio of the serving cell, where the following is specifically included:

When the uplink-to-downlink ratio of the serving cell is 1:9, each radio frame includes 10 subframes, where in each radio frame, the sixth subframe is the downlink subframe, the tenth subframe is the uplink subframe, and the first subframe, the second subframe, the third subframe, the fourth subframe, the fifth subframe, the seventh subframe, the eighth subframe, and the ninth subframe are the first special subframes; or when the uplink-to-downlink ratio of the serving cell is 2:8, each radio frame includes 10 subframes, where in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3:7, each radio frame includes 10 subframes, where in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4:6, each radio frame includes 10 subframes, where in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5:5, each radio frame includes 10 subframes, where in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

In some embodiments, the transceiver may be further configured to:

send, to the user equipment in a subframe n in the serving cell, physical downlink shared channel transmission or a downlink control channel indicating downlink semi-persistent scheduling release, where n is an integer, and n is a subframe number; and receive, in a subframe n+k, a hybrid automatic repeat request-acknowledgment HARQ-ACK response that is fed back by the user equipment and is corresponding to the physical downlink shared channel transmission or the downlink control channel that is sent in the subframe n in the serving cell, where k is an integer.

When the subframe n is corresponding to the first subframe in each radio frame, a value of k is 4; or otherwise, a value of k is 5.

In some embodiments, the transceiver may be further configured to:

send, to the user equipment in a subframe i, a downlink control channel that schedules a physical uplink shared channel; and receive, in a subframe i+5 in the serving cell, the physical uplink shared channel scheduled by the downlink control channel, where i is an integer, and i is a subframe number.

In some embodiments, the transceiver may be further configured to:

receive, in a subframe j in the serving cell, a physical uplink shared channel sent by the user equipment; and send, in a subframe j+5, an HARQ-ACK corresponding to the physical uplink shared channel, where j is an integer, and j is a subframe number.

In some embodiments, the transceiver may be further configured to:

send, in a subframe h, an HARQ-ACK corresponding to a physical uplink shared channel sent by the user equipment; and receive retransmission of the physical uplink shared channel in a subframe h+5 in the serving cell, where h is an integer, and h is a subframe number.

Each radio frame corresponding to the frame structure may include 10 subframes, and in each radio frame, the sixth subframe is the downlink subframe, the tenth subframe is the uplink subframe, the first subframe, the second subframe, the third subframe, the fifth subframe, the seventh subframe, and the ninth subframe are the first special subframes, and the fourth subframe and the eighth subframe are the second special subframes. Alternatively, each radio frame corresponding to the frame structure may include 10 subframes, and in each radio frame, the fourth subframe and the sixth subframe are the downlink subframes, the tenth subframe is the uplink subframe, the first subframe, the second subframe, the third subframe, the fifth subframe, the seventh subframe, and the ninth subframe are the first special subframes, and the eighth subframe is the second special subframe.

In some embodiments, the transceiver is further configured to:

send, to the user equipment in a subframe i, a downlink control channel that schedules a physical uplink shared channel; and receive, in a subframe i+4 in the serving cell, the physical uplink shared channel scheduled by the downlink control channel, where i is an integer, and i is a subframe number.

In some embodiments, the transceiver may be further configured to:

receive, in a subframe j in the serving cell, a physical uplink shared channel sent by the user equipment; and send, in a subframe j+4, an HARQ-ACK corresponding to the physical uplink shared channel, where j is an integer, and j is a subframe number.

In some embodiments, the transceiver may be further configured to:

send, in a subframe h, an HARQ-ACK corresponding to a physical uplink shared channel sent by the user equipment; and receive retransmission of the physical uplink shared channel in a subframe h+4 in the serving cell, where h is an integer, and h is a subframe number.

In some embodiments, the transceiver may be further configured to: if the subframe h+4 is the downlink subframe or the first special subframe, receive retransmission of the physical uplink shared channel in a subframe h+4+8×a in the serving cell, where a is a positive integer greater than or equal to 1, and the subframe h+4+8×a is the first available uplink subframe or second special subframe.

If the user equipment is legacy user equipment, the uplink-to-downlink ratio that is of the serving cell and is configured by the base station for the user equipment is an uplink-to-downlink ratio 0.

If the user equipment is legacy user equipment, the transceiver may be further configured to send information to or receive information from the user equipment in the serving cell based on the frame structure and according to HARQ timing in LTE release 8

In the frame structure of the serving cell, each subframe is a subframe of 1 ms, the first special subframe includes 12 symbols used for downlink transmission, a GP whose duration is one symbol, and one symbol used for uplink transmission, and the second special subframe includes one symbol used for downlink transmission, a GP whose duration is one symbol, and 12 symbols used for uplink transmission.

In this embodiment, the base station determines the frame structure of the serving cell. Each radio frame corresponding to the frame structure includes the at least one downlink subframe, the at least one uplink subframe, and the at least one special subframe. The special subframe is the first special subframe or the second special subframe. The at least one downlink subframe includes the subframe l. The at least one uplink subframe includes the subframe l+4. The at least one special subframe includes the subframe l+5, and the subframe l+5 is the first special subframe, where l is an integer, and l is an odd multiple of 5. The base station sends information to or receives information from the user equipment in the serving cell based on the frame structure. The special subframe includes the time domain symbol used for downlink transmission, the guard period GP, and the time domain symbol used for uplink transmission. The quantity of time domain symbols used for downlink transmission is greater than the quantity of time domain symbols used for uplink transmission in the first special subframe. The quantity of time domain symbols used for downlink transmission is less than the quantity of time domain symbols used for uplink transmission in the second special subframe. The downlink transmission includes physical downlink control channel transmission. The uplink transmission includes hybrid automatic repeat request-acknowledgment HARQ-ACK transmission. Therefore, same HARQ timing is used for different uplink-downlink configurations, and compared with a frame structure type 2 in an existing LTE release, implementation complexity and protocol complexity are reduced.

Figure 6A:
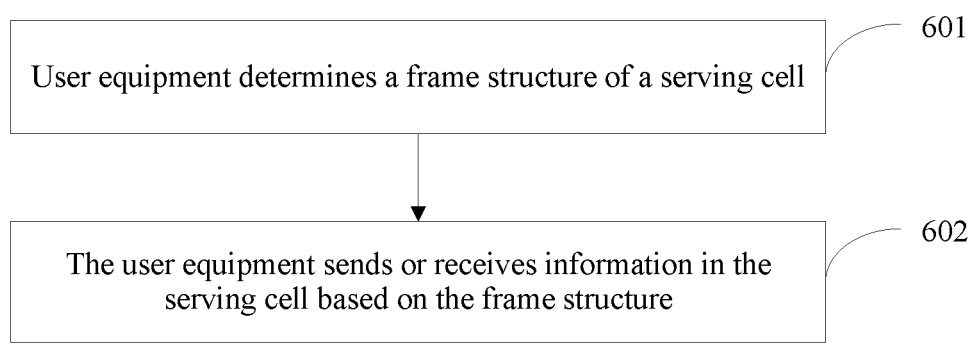
FIG. 6A is a schematic flowchart of an information sending or receiving method according to an embodiment of the present invention.

Referring to FIG. 6A, FIG. 6A is a schematic flowchart of an information sending or receiving method according to an embodiment of the present invention. The method includes the following steps.

Step 601: User equipment determines a frame structure of a serving cell.

In a possible implementation, the user equipment may determine the frame structure of the serving cell according to an uplink-to-downlink ratio of the serving cell. Different uplink-to-downlink ratios are corresponding to different frame structures, and frames corresponding to different frame structures have different composition.

Each of radio frames corresponding to different frame structures may include at least one downlink subframe, at least one uplink subframe, and at least one special subframe. The special subframe is a first special subframe or a second special subframe. When a quantity of special subframes in the at least one special subframe is greater than or equal to 2, the at least one special subframe may include at least one first special subframe and/or at least one second special subframe. The at least one downlink subframe includes a subframe l. The at least one uplink subframe includes a subframe l+4. The at least one special subframe includes a subframe l+5, and the subframe l+5 is the first special subframe, where l is an integer, l is an odd multiple of 5, and l is a subframe number.

The special subframe may include a time domain symbol used for downlink transmission, a GP, and a time domain symbol used for uplink transmission. A quantity of time domain symbols used for downlink transmission is greater than a quantity of time domain symbols used for uplink transmission in the first special subframe. A quantity of time domain symbols used for downlink transmission is less than a quantity of time domain symbols used for uplink transmission in the second special subframe. The downlink transmission may include PDCCH transmission. The uplink transmission may include HARQ-ACK transmission. The first subframe may be used to transmit a PDSCH. The second subframe may be used to transmit a PUSCH.

A length of each subframe in the frame structure of the serving cell is not limited in all embodiments of the present application, and is preferably 1 ms.

Figure 6B:
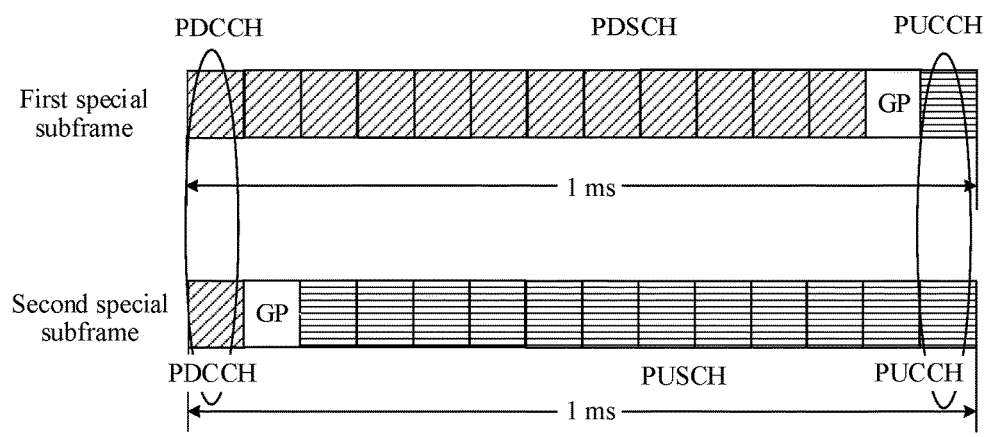
FIG. 6B is an example structural diagram of a first special subframe and a second special subframe according to an embodiment of the present invention.

Specific subframe structures of the first special subframe and the second special subframe are not limited in all the embodiments of the present application. By using FIG. 6B, subframe structures that are of the first special subframe and the second special subframe and are existing when a subframe length is 1 ms are described in the following by using an example. In the subframe structures shown in FIG. 6B, the first special subframe includes 12 symbols used for downlink transmission, a GP whose duration is one symbol, and one symbol used for uplink transmission, and the second special subframe includes one symbol used for downlink transmission, a GP whose duration is one symbol, and 12 symbols used for uplink transmission. For a symbol herein, the symbol used for downlink transmission may be an orthogonal frequency division multiplexing (OFDM) symbol, and the symbol used for uplink transmission may be a single carrier frequency division multiple access (SC-FDMA) symbol. It should be noted that both the first special subframe and the second special subframe in all the embodiments of the present application may be special subframes, but an actual subframe structure of the special subframe may be different from a subframe structure of a special subframe in existing LTE release 8, release 9, release 10, release 11, and release 12.

In the first special subframe, the time domain symbol used for downlink transmission may be used to transmit a PDCCH and/or a PDSCH. For example, referring to the example in FIG. 6B, in the first special subframe, the first time domain symbol used for downlink transmission is used to transmit a PDCCH, and the second to the twelfth time domain symbols used for downlink transmission are used to transmit a PDSCH. In the second special subframe, the time domain symbol used for uplink transmission may be used to transmit a PUCCH and/or a PUSCH. For example, referring to the example in FIG. 6B, in the second special subframe, the second to the thirteenth time domain symbols used for uplink transmission are used to transmit a PUSCH, and the fourteenth time domain symbol used for uplink transmission is used to transmit a PUCCH. It should be noted that the structures of the first special subframe and the second special subframe herein are only examples, and the first special subframe and the second special subframe may further have other structures. For example, all the first three symbols in the first special subframe may be used to transmit a PDCCH, or in the first special subframe, there may be more than one symbol used for uplink transmission.

In the first special subframe, the time domain symbol used for uplink transmission may be used to transmit only a PUCCH and/or a sounding reference signal SRS. For example, referring to the example in FIG. 6B, in the first special subframe, the time domain symbol used for uplink transmission is used to transmit a PUCCH. In the second special subframe, the time domain symbol used for downlink transmission may be used to transmit only a PDCCH and/or a downlink reference signal. For example, referring to the example in FIG. 6B, in the second special subframe, the time domain symbol used for downlink transmission is used to transmit a PDCCH.

Based on the foregoing description, the frame structure that is of the serving cell and is determined in this step is described by using examples as follows.

It should be noted that in all the embodiments of the present invention, assuming that the uplink-to-downlink ratio of the serving cell is X:Y, it may indicate that in the frame structure of the serving cell, a ratio of a quantity of subframes used for uplink transmission to a quantity of subframes used for downlink transmission is X:Y. The subframe used for uplink transmission includes the uplink subframe and the second special subframe, and the subframe used for downlink transmission includes the downlink subframe and the first special subframe. Assuming that the uplink-to-downlink ratio of the serving cell is X:Y, it may also indicate that in the frame structure of the serving cell, in one radio frame, the quantity of subframes used for uplink transmission is X, and the quantity of subframes used for downlink transmission is Y. It should be noted that in all the embodiments of the present application, an uplink-downlink configuration of the serving cell may indicate the uplink-to-downlink ratio of the serving cell, and may further indicate a location of the downlink subframe, the uplink subframe, the special subframe, the first special subframe, and/or the second special subframe in each radio frame corresponding to the frame structure of the serving cell. For example, if the uplink-downlink configuration of the serving cell is an uplink-downlink configuration 2 in Table 1, the uplink-to-downlink ratio corresponding to the serving cell is 2:8, and locations of the downlink subframe, the uplink subframe, and the special subframe in each radio frame corresponding to the frame structure of the serving cell are shown in Table 1.

Example 1

Each radio frame corresponding to the frame structure may include 10 subframes, and the second subframe and the seventh subframe in each radio frame are the first special subframes. When the second subframe and the seventh subframe are the first special subframes, the first special subframe may be a special subframe in existing LTE release 8, release 9, release 10, release 11, and release 12. In addition, the second subframe and the seventh subframe may have different special subframe configurations. For example, the second subframe may have a special subframe configuration 0 or a special subframe configuration 5 in existing LTE release 8, release 9, release 10, release 11, and release 12, and the configuration of the second subframe may be another special subframe configuration in existing LTE release 8, release 9, release 10, release 11, and release 12, for example, may be a special subframe configuration 7. When the second subframe and the seventh subframe are special subframes in existing LTE release 8, release 9, release 10, release 11, and release 12, a UpPTS in the special subframe may also be used to transmit an HARQ-ACK.

In the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, where m is an integer, the subframe m is not the second subframe in each radio frame, and m is a subframe number.

The determining, by user equipment, a frame structure of a serving cell may include:

determining, by the user equipment, the frame structure of the serving cell according to an uplink-to-downlink ratio of the serving cell, where the following may be specifically included:

When the uplink-to-downlink ratio of the serving cell is 1:9, each radio frame corresponding to the frame structure includes 10 subframes, where in each radio frame, the fourth subframe and the sixth subframe are the downlink subframes, the tenth subframe is the uplink subframe, and the first subframe, the second subframe, the third subframe, the fifth subframe, the seventh subframe, the eighth subframe, and the ninth subframe are the first special subframes; or when the uplink-to-downlink ratio of the serving cell is 2:8, each radio frame corresponding to the frame structure includes 10 subframes, where in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3:7, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4:6, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5:5, each radio frame corresponding to the frame structure includes 10 subframes, where in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

Example 2

Each radio frame corresponding to the frame structure may include 10 subframes, and the first subframe, the second subframe, and the seventh subframe in each radio frame are the first special subframes.

Further, the determining, by user equipment, a frame structure of a serving cell may include:

determining, by the user equipment, the frame structure of the serving cell according to an uplink-to-downlink ratio of the serving cell, where the following may be specifically included:

When the uplink-to-downlink ratio of the serving cell is 1:9, each radio frame includes 10 subframes, where in each radio frame, the sixth subframe is the downlink subframe, the tenth subframe is the uplink subframe, and the first subframe, the second subframe, the third subframe, the fourth subframe, the fifth subframe, the seventh subframe, the eighth subframe, and the ninth subframe are the first special subframes; or when the uplink-to-downlink ratio of the serving cell is 2:8, each radio frame includes 10 subframes, where in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3:7, each radio frame includes 10 subframes, where in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4:6, each radio frame includes 10 subframes, where in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5:5, each radio frame includes 10 subframes, where in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

Example 3

Each radio frame corresponding to the frame structure may include 10 subframes, and in each radio frame, the sixth subframe is the downlink subframe, the tenth subframe is the uplink subframe, the first subframe, the second subframe, the third subframe, the fifth subframe, the seventh subframe, and the ninth subframe are the first special subframes, and the fourth subframe and the eighth subframe are the second special subframes.

Example 4

Each radio frame corresponding to the frame structure may include 10 subframes, and in each radio frame, the fourth subframe and the sixth subframe are the downlink subframes, the tenth subframe is the uplink subframe, the first subframe, the second subframe, the third subframe, the fifth subframe, the seventh subframe, and the ninth subframe are the first special subframes, and the eighth subframe is the second special subframe.

Example 5

Each radio frame corresponding to the frame structure may include 10 subframes, and in each radio frame, the first subframe and the sixth subframe are the downlink subframes, the third subframe and the eighth subframe are the uplink subframes, the second subframe and the seventh subframe are special subframes, and the fourth subframe, the fifth subframe, the ninth subframe, and the tenth subframe are the first special subframes. That the second subframe and the seventh subframe are special subframes means that the second subframe and the seventh subframe are special subframes in LTE release 12 and earlier releases. A configuration of the special subframe may be one of nine existing special subframe configurations in LTE release 12 and earlier releases. The first special subframe may be a special subframe in LTE release 12 and earlier releases, and support the nine special subframe configurations in existing LTE release 12 and earlier releases. The first special subframe may further be different from the special subframe in existing LTE release 12 and earlier releases, for example, the first special subframe may support at least one of the following composition manners:

a composition manner 1: 10 symbols used for downlink transmission, a GP whose duration is one symbol, and three symbols used for uplink transmission;

a composition manner 2: nine symbols used for downlink transmission, a GP whose duration is one symbol, and four symbols used for uplink transmission;

a composition manner 3: eight symbols used for downlink transmission, a GP whose duration is one symbol, and five symbols used for uplink transmission; or a composition manner 4: nine symbols used for downlink transmission, a GP whose duration is two symbols, and three symbols used for uplink transmission.

The frame structure may support backward compatibility, that is, the first subframe, the second subframe, the sixth subframe, and the seventh subframe may support downlink transmission to legacy user equipment (such as user equipment supporting only LTE release 12 and earlier releases), and the third subframe and the eighth subframe may support uplink transmission from the legacy user equipment. In addition, when the first special subframe uses one of the four composition manners, the first special subframe can support transmission of more than two SRS symbols, and an SRS capacity is expanded, so that channel reciprocity can be better used in a system, and system performance is improved. Moreover, the first special subframe is introduced in the frame structure, so that uplink HARQ timing of subframes different from the second subframe and the seventh subframe is n+4, and therefore, delays of these subframes are shortened. It should be noted that when the frame structure of the serving cell is a frame structure given in Example 5, the legacy user equipment may be indicated that the frame structure of the serving cell is a frame structure corresponding to an uplink-downlink configuration 2 in LTE release 12 and earlier releases.

If the user equipment in this step is legacy user equipment, for example, is user equipment corresponding to LTE release 12 and earlier releases, or the user equipment supports only LTE release 12 and earlier releases, an uplink-downlink configuration that is of the serving cell and is configured for the user equipment is an uplink-downlink configuration 0. Further, the determining, by user equipment, a frame structure of a serving cell may include:

determining, by the user equipment, that the frame structure of the serving cell is a frame structure corresponding to an uplink-downlink configuration 0 in a frame structure type 2 in LTE release 8, where the following may be specifically included: Each radio frame includes 10 subframes, and in each radio frame, the first subframe and the sixth subframe are the downlink subframes, the third subframe, the fourth subframe, the fifth subframe, the eighth subframe, the ninth subframe, and the tenth subframe are the uplink subframes, and the second subframe and the seventh subframe are special subframes. The special subframe is a special subframe in the frame structure type 2 in LTE release 8. A subframe structure of the special subframe may be a subframe structure corresponding to a special subframe configuration 0 or a special subframe configuration 5 in LTE release 8.

It should be noted that the frame structure of the serving cell is actually the foregoing defined frame structure in this step, and is different from the frame structure corresponding to the uplink-downlink configuration 0 in the frame structure type 2 in LTE release 8. Herein, only the user equipment supporting only LTE release 12 and earlier releases considers that the frame structure of the serving cell is the frame structure corresponding to the uplink-downlink configuration 0 in the frame structure type 2 in LTE release 8.

In all the embodiments of the present application, a serving cell corresponding to the user equipment may be a serving cell configured by a network side device for the user equipment, or a serving cell that serves the user equipment, or a serving cell accessed by the user equipment. The serving cell in this embodiment of the present invention may also be referred to as a carrier. In this embodiment of the present invention, the serving cell may be a primary serving cell or a secondary serving cell of the user equipment.

In this step, in a first aspect, the uplink-downlink configuration that is of the serving cell and is configured for the legacy user equipment is the uplink-downlink configuration 0, so that the user equipment sends or receives information according to the frame structure and HARQ timing that are corresponding to the uplink-downlink configuration 0 in LTE release 8. In a second aspect, in the frame structure of the serving cell, the subframe 1 is the downlink subframe, and the subframe l+4 is the uplink subframe, so that the UE supporting only LTE release 12 and earlier releases can send or receive information at least in these subframes. In a third aspect, the subframe l+5 is the first special subframe, and because the first 12 symbols in the first special subframe are downlink transmission symbols, physical layer measurement performed by the legacy user equipment in the subframe l+5 is not affected. In a fourth aspect, in the frame structure of the serving cell, the second subframe and the seventh subframe in each radio frame are set as the first special subframes or the second special subframes. When the second subframe and the seventh subframe in each radio frame are set as the first special subframes, because the first 12 symbols in the first special subframe are downlink transmission symbols, physical layer measurement performed, in the second subframe and the seventh subframe, by the user equipment supporting only LTE release 12 and earlier releases is not affected. When the second subframe and the seventh subframe in each radio frame are set as the second special subframes, while the user equipment supporting only LTE release 12 and earlier releases is notified that the uplink-downlink configuration of the serving cell is the uplink-downlink configuration 0, the user equipment is indicated that a special subframe configuration is the special subframe configuration 0 or the special subframe configuration 5, so that physical layer measurement performed, in the second subframe and the seventh subframe, by the user equipment supporting only LTE release 12 and earlier releases is not affected. According to the foregoing aspects, the new frame structure can be backward-compatible.

Step 602: The user equipment sends or receives information in the serving cell based on the frame structure.

In this step, the user equipment sends or receives information in the serving cell based on the frame structure determined in step 601.

Implementation of this step is described in the following by using examples.

Example 1

This example is preferably applicable to a case in which the frame structure in step 601 is implemented by using Example 1 in step 601.

In a possible implementation, this step that the user equipment sends or receives information in the serving cell based on the frame structure in step 601 may be performed according to the following uplink HARQ timing:

The user equipment receives physical downlink shared channel transmission in a subframe n in the serving cell, or the user equipment receives, in a subframe n in the serving cell, a downlink control channel indicating downlink semi-persistent scheduling release, where n is an integer, and n is a subframe number; and the user equipment sends, in a subframe n+k, an HARQ-ACK response corresponding to the physical downlink shared channel transmission or the downlink control channel that is received in the subframe n in the serving cell, where k is an integer.

When the subframe n is corresponding to the second subframe in each radio frame, a value of k is 5; or otherwise, a value of k is 4.

In a second possible implementation, this step that the user equipment sends or receives information in the serving cell based on the frame structure in step 601 may be performed according to the following downlink HARQ timing:

The user equipment receives, in a subframe i, a downlink control channel that schedules a PUSCH; and the user equipment sends, in a subframe i+4 in the serving cell, the PUSCH scheduled by the downlink control channel, where i is an integer, and i is a subframe number.

In a third possible implementation, this step that the user equipment sends or receives information in the serving cell based on the frame structure in step 601 may be performed according to the following downlink HARQ timing:

The user equipment sends a PUSCH in a subframe j in the serving cell; and the user equipment receives, in a subframe j+6, an HARQ-ACK corresponding to the PUSCH, where j is an integer, and j is a subframe number.

In a fourth possible implementation, this step that the user equipment sends or receives information in the serving cell based on the frame structure in step 601 may be performed according to the following downlink HARQ timing:

The user equipment receives, in a subframe h, an HARQ-ACK corresponding to a physical uplink shared channel; and the user equipment sends, in a subframe h+4 in the serving cell, the physical uplink shared channel corresponding to the HARQ-ACK, where h is an integer, and h is a subframe number.

Example 2

This example is preferably applicable to a case in which the frame structure in step 601 is implemented by using Example 2 in step 601.

In a first possible implementation, this step that the user equipment sends or receives information in the serving cell based on the frame structure in step 601 may be performed according to the following uplink HARQ timing:

The user equipment receives physical downlink shared channel transmission in a subframe n in the serving cell, or the user equipment receives, in a subframe n in the serving cell, a downlink control channel indicating downlink semi-persistent scheduling release, where n is an integer, and n is a subframe number; and the user equipment sends, in a subframe n+k, an HARQ-ACK response corresponding to the physical downlink shared channel transmission or the downlink control channel that is received in the subframe n in the serving cell, where k is an integer.

When the subframe n is corresponding to the first subframe in each radio frame, a value of k is 4; or otherwise, a value of k is 5.

In a second possible implementation, this step that the user equipment sends or receives information in the serving cell based on the frame structure in step 601 may be performed according to the following downlink HARQ timing:

The user equipment receives, in a subframe i, a downlink control channel that schedules a physical uplink shared channel; and the user equipment sends, in a subframe i+5 in the serving cell, the physical uplink shared channel scheduled by the downlink control channel, where i is an integer, and i is a subframe number.

In a third possible implementation, this step that the user equipment sends or receives information in the serving cell based on the frame structure in step 601 may be performed according to the following downlink HARQ timing:

The user equipment sends a PUSCH in a subframe j in the serving cell; and the user equipment receives, in a subframe j+5, an HARQ-ACK corresponding to the PUSCH, where j is an integer, and j is a subframe number.

In a fourth possible implementation, this step that the user equipment sends or receives information in the serving cell based on the frame structure in step 601 may be performed according to the following downlink HARQ timing:

The user equipment receives, in a subframe h, an HARQ-ACK corresponding to a PUSCH; and the user equipment sends, in a subframe h+5 in the serving cell, the PUSCH corresponding to the HARQ-ACK, where h is an integer, and h is a subframe number.

Example 3

This example is preferably applicable to a case in which the frame structure in step 601 is implemented by using Example 3 or 4 in step 601.

In a first possible implementation, this step that the user equipment sends or receives information in the serving cell based on the frame structure in step 601 may be performed according to the following uplink HARQ timing:

The user equipment receives, in a subframe i, a downlink control channel that schedules a physical uplink shared channel; and the user equipment sends, in a subframe n+4 in the serving cell, the physical uplink shared channel scheduled by the downlink control channel, where n is an integer, and n is a subframe number.

In a second possible implementation, this step that the user equipment sends or receives information in the serving cell based on the frame structure in step 601 may be performed according to the following downlink HARQ timing:

The user equipment receives, in a subframe i, a downlink control channel that schedules a physical uplink shared channel; and the user equipment sends, in a subframe i+4 in the serving cell, the physical uplink shared channel scheduled by the downlink control channel, where i is an integer, and i is a subframe number.

In a third possible implementation, this step that the user equipment sends or receives information in the serving cell based on the frame structure in step 601 may be performed according to the following uplink HARQ timing:

The user equipment sends a physical uplink shared channel in a subframe j in the serving cell; and the user equipment receives, in a subframe j+4, an HARQ-ACK corresponding to the physical uplink shared channel, where j is an integer, and j is a subframe number.

In a fourth possible implementation, this step that the user equipment sends or receives information in the serving cell based on the frame structure in step 601 may be performed according to the following uplink HARQ timing:

The user equipment receives, in a subframe h, an HARQ-ACK corresponding to a physical uplink shared channel; and the user equipment sends, in a subframe h+4 in the serving cell, the physical uplink shared channel corresponding to the HARQ-ACK, where h is an integer, and h is a subframe number.

If the subframe h+4 is the downlink subframe or the first special subframe, the user equipment sends, in a subframe h+4+8×a in the serving cell, the physical uplink shared channel corresponding to the HARQ-ACK, where a is a positive integer greater than or equal to 1, and the subframe h+4+8×a is the first available uplink subframe or second special subframe.

In this step, if the user equipment is legacy user equipment, the user equipment may send or receive information in the serving cell based on the frame structure and according to HARQ timing in LTE release 8. Specifically, the user equipment may send or receive information in the serving cell based on the frame structure and according to the HARQ timing corresponding to the uplink-downlink configuration 0 in the frame structure type 2 in LTE release 8. Details are as follows.

In a first possible implementation, this step that the user equipment sends or receives information in the serving cell based on the frame structure in step 601 may be performed according to the following uplink HARQ timing:

The user equipment receives physical downlink shared channel transmission in a subframe n−4 in the serving cell, or the user equipment receives, in a subframe n−4 in the serving cell, a downlink control channel indicating downlink semi-persistent scheduling release, where n is an integer, and n is a subframe number; and the user equipment sends, in a subframe n, a hybrid automatic repeat request-acknowledgment HARQ-ACK response corresponding to the physical downlink shared channel transmission or the downlink control channel that is received in the subframe n−4 in the serving cell.

In a second possible implementation, this step that the user equipment sends or receives information in the serving cell based on the frame structure in step 601 may be performed according to the following downlink HARQ timing:

The user equipment receives, in a subframe i, a downlink control channel that schedules a physical uplink shared channel; and the user equipment sends, in a subframe i+4 in the serving cell, the physical uplink shared channel scheduled by the downlink control channel, where i is an integer, and i is a subframe number.

In a third possible implementation, this step that the user equipment sends or receives information in the serving cell based on the frame structure in step 601 may be performed according to the following downlink HARQ timing:

The user equipment sends a physical uplink shared channel in a subframe j in the serving cell; and the user equipment receives, in a subframe j+6, an HARQ-ACK corresponding to the physical uplink shared channel, where j is an integer, and j is a subframe number.

In a fourth possible implementation, this step that the user equipment sends or receives information in the serving cell based on the frame structure in step 601 may be performed according to the following downlink HARQ timing:

The user equipment receives, in a subframe h, an HARQ-ACK corresponding to a physical uplink shared channel; and the user equipment sends, in a subframe h+4 in the serving cell, the physical uplink shared channel corresponding to the HARQ-ACK, where h is an integer, and h is a subframe number.

Example 4

This example is preferably applicable to a case in which the frame structure in step 601 is implemented by using Example 5 in step 601.

In a first possible implementation, this step that the user equipment sends or receives information in the serving cell based on the frame structure in step 601 may be performed according to the following uplink HARQ timing:

The user equipment receives physical downlink shared channel transmission in a subframe n in the serving cell, or the user equipment receives, in a subframe n in the serving cell, a downlink control channel indicating downlink semi-persistent scheduling release, where n is an integer, and n is a subframe number; and the user equipment sends, in a subframe n+k, an HARQ-ACK response corresponding to the physical downlink shared channel transmission or the downlink control channel that is received in the subframe n in the serving cell, where k is an integer.

When the subframe n is corresponding to the second subframe or the seventh subframe in each radio frame, a value of k is 5 or 6; or otherwise, a value of k is 4.

It can be learned from the uplink HARQ timing that, in the frame structure given in Example 5 in step 601, values of k corresponding to the first subframe, the fourth subframe, the fifth subframe, the sixth subframe, the ninth subframe, and the tenth subframe are 4. Compared with uplink HARQ timing (values of k corresponding to an uplink-downlink configuration 2 in Table 2) in existing LTE release 12, values of k corresponding to most subframes are decreased to 4, so that delays of these subframes are shortened.

In a second possible implementation, this step that the user equipment sends or receives information in the serving cell based on the frame structure in step 601 may be performed according to the following downlink HARQ timing:

The user equipment receives, in a subframe i, a downlink control channel that schedules a physical uplink shared channel; and the user equipment sends, in a subframe i+4 in the serving cell, the physical uplink shared channel scheduled by the downlink control channel, where i is an integer, and i is a subframe number.

In a third possible implementation, this step that the user equipment sends or receives information in the serving cell based on the frame structure in step 601 may be performed according to the following downlink HARQ timing:

The user equipment sends a physical uplink shared channel in a subframe j in the serving cell; and the user equipment receives, in a subframe j+6, an HARQ-ACK corresponding to the physical uplink shared channel, where j is an integer, and j is a subframe number.

In a fourth possible implementation, this step that the user equipment sends or receives information in the serving cell based on the frame structure in step 601 may be performed according to the following downlink HARQ timing:

The user equipment receives, in a subframe h, an HARQ-ACK corresponding to a physical uplink shared channel; and the user equipment sends, in a subframe h+4 in the serving cell, the physical uplink shared channel corresponding to the HARQ-ACK, where h is an integer, and h is a subframe number.

In this step, it can be learned from any HARQ timing defined in Example 1 to Example 3 that, the HARQ timing does not depend on a specific uplink-downlink configuration of the serving cell, that is, same HARQ timing is used for different uplink-downlink configurations. Therefore, compared with the frame structure type 2 in an existing LTE release, implementation complexity and protocol complexity can be reduced. In addition, the uplink HARQ timing is used, so that an HARQ-ACK only for one downlink subframe or one first special subframe needs to be fed back in one uplink subframe or one second special subframe. Therefore, compared with a case in which HARQ-ACKs for multiple downlink subframes need to be fed back in one uplink subframe in an existing LTE system, a quantity of feedbacks is reduced, and HARQ-ACK performance is improved. In addition, the frame structure enables the user equipment supporting only LTE release 12 and earlier releases to send or receive information according to the HARQ timing corresponding to the uplink-downlink configuration 0 in the frame structure type 2 in LTE release 8, so that backward-compatibility is kept.

In this embodiment, the user equipment determines the frame structure of the serving cell. The radio frame corresponding to the frame structure includes the at least one downlink subframe, the at least one uplink subframe, and the at least one special subframe. The special subframe is the first special subframe or the second special subframe. The at least one downlink subframe includes the subframe l. The at least one uplink subframe includes the subframe l+4. The at least one special subframe includes the subframe l+5, and the subframe l+5 is the first special subframe, where l is a positive integer, and l is an odd multiple of 5. The user equipment sends or receives information in the serving cell based on the frame structure. The special subframe includes the symbol used for downlink transmission, the guard period GP, and the symbol used for uplink transmission. The quantity of symbols used for downlink transmission is greater than the quantity of symbols used for uplink transmission in the first special subframe. The quantity of symbols used for downlink transmission is less than the quantity of symbols used for uplink transmission in the second special subframe. The downlink transmission includes physical downlink control channel transmission. The uplink transmission includes hybrid automatic repeat request-acknowledgment HARQ-ACK transmission. Therefore, same HARQ timing is used for different uplink-downlink configurations, and compared with a frame structure type 2 in an existing LTE release, implementation complexity and protocol complexity of a TDD system are reduced.

Figure 7:
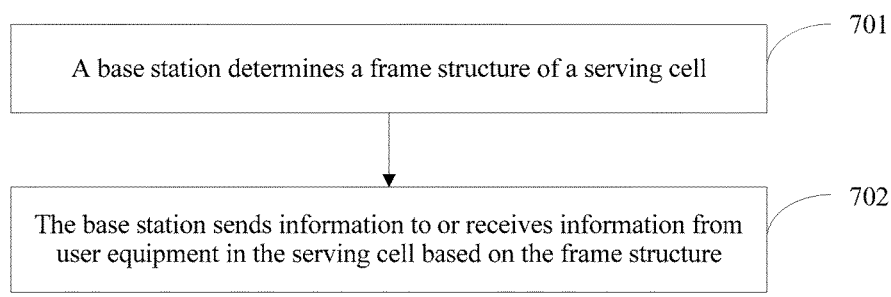
FIG. 7 is another schematic flowchart of an information sending or receiving method according to an embodiment of the present invention.

Referring to FIG. 7, FIG. 7 is another schematic flowchart of an information sending or receiving method according to an embodiment of the present invention. The method includes the following steps.

Step 701: A base station determines a frame structure of a serving cell.

In this step, the serving cell is a serving cell corresponding to user equipment. Specifically, the base station may determine the frame structure of the serving cell according to an uplink-to-downlink ratio of the serving cell. Different uplink-to-downlink ratios are corresponding to different frame structures, and frames corresponding to different frame structures have different composition.

Each of radio frames corresponding to different frame structures may include at least one downlink subframe, at least one uplink subframe, and at least one special subframe. The special subframe is a first special subframe or a second special subframe. When a quantity of special subframes in the at least one special subframe is greater than or equal to 2, the at least one special subframe may include at least one first special subframe and/or at least one second special subframe. The at least one downlink subframe includes a subframe l. The at least one uplink subframe includes a subframe l+4. The at least one special subframe includes a subframe l+5, and the subframe l+5 is the first special subframe, where l is an integer, l is an odd multiple of 5, and l is a subframe number.

The special subframe may include a time domain symbol used for downlink transmission, a GP, and a time domain symbol used for uplink transmission. A quantity of time domain symbols used for downlink transmission is greater than a quantity of time domain symbols used for uplink transmission in the first special subframe. A quantity of time domain symbols used for downlink transmission is less than a quantity of time domain symbols used for uplink transmission in the second special subframe. The downlink transmission includes physical downlink control channel transmission. The uplink transmission includes HARQ-ACK transmission. The first subframe may be used to transmit a PDSCH. The second subframe may be used to transmit a PUSCH.

A length of each subframe in the frame structure of the serving cell is not limited in all embodiments of the present application, and is preferably 1 ms.

For implementation of the first special subframe and the second special subframe in this step, refer to related descriptions of the first special subframe and the second special subframe in the embodiment shown in FIG. 6A, and details are not described herein again.

Based on the foregoing description, the frame structure of the serving cell that is determined in this step is described by using examples as follows.

It should be noted that in all the embodiments of the present application, assuming that the uplink-to-downlink ratio of the serving cell is X:Y, it may indicate that in the frame structure of the serving cell, a ratio of a quantity of subframes used for uplink transmission to a quantity of subframes used for downlink transmission is X:Y. The subframe used for uplink transmission includes the uplink subframe and the second special subframe, and the subframe used for downlink transmission includes the downlink subframe and the first special subframe. Assuming that the uplink-to-downlink ratio of the serving cell is X:Y, it may also indicate that in the frame structure of the serving cell, in one radio frame, the quantity of subframes used for uplink transmission is X, and the quantity of subframes used for downlink transmission is Y.

Example 1

Each radio frame corresponding to the frame structure may include 10 subframes, and the second subframe and the seventh subframe in each radio frame are the first special subframes.

In the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, where m is an integer, the subframe m is not the second subframe in each radio frame, and m is a subframe number.

The determining, by a base station, a frame structure of a serving cell may include:

determining, by the base station, the frame structure of the serving cell according to an uplink-to-downlink ratio of the serving cell, where the following may be specifically included:

When the uplink-to-downlink ratio of the serving cell is 1:9, each radio frame corresponding to the frame structure includes 10 subframes, where in each radio frame, the fourth subframe and the sixth subframe are the downlink subframes, the tenth subframe is the uplink subframe, and the first subframe, the second subframe, the third subframe, the fifth subframe, the seventh subframe, the eighth subframe, and the ninth subframe are the first special subframes; or when the uplink-to-downlink ratio of the serving cell is 2:8, each radio frame corresponding to the frame structure includes 10 subframes, where in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3:7, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4:6, each radio frame corresponding to the frame structure includes 10 subframes, where in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5:5, each radio frame corresponding to the frame structure includes 10 subframes, where in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

Example 2

Each radio frame corresponding to the frame structure may include 10 subframes, and the first subframe, the second subframe, and the seventh subframe in each radio frame are the first special subframes.

Further, the determining, by a base station, a frame structure of a serving cell may include:

determining, by the base station, the frame structure of the serving cell according to an uplink-to-downlink ratio of the serving cell, where the following may be specifically included:

When the uplink-to-downlink ratio of the serving cell is 1:9, each radio frame includes 10 subframes, where in each radio frame, the sixth subframe is the downlink subframe, the tenth subframe is the uplink subframe, and the first subframe, the second subframe, the third subframe, the fourth subframe, the fifth subframe, the seventh subframe, the eighth subframe, and the ninth subframe are the first special subframes; or when the uplink-to-downlink ratio of the serving cell is 2:8, each radio frame includes 10 subframes, where in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3:7, each radio frame includes 10 subframes, where in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4:6, each radio frame includes 10 subframes, where in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5:5, each radio frame includes 10 subframes, where in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

Example 3

Each radio frame corresponding to the frame structure may include 10 subframes, and in each radio frame, the sixth subframe is the downlink subframe, the tenth subframe is the uplink subframe, the first subframe, the second subframe, the third subframe, the fifth subframe, the seventh subframe, and the ninth subframe are the first special subframes, and the fourth subframe and the eighth subframe are the second special subframes.

Example 4

Each radio frame corresponding to the frame structure may include 10 subframes, and in each radio frame, the fourth subframe and the sixth subframe are the downlink subframes, the tenth subframe is the uplink subframe, the first subframe, the second subframe, the third subframe, the fifth subframe, the seventh subframe, and the ninth subframe are the first special subframes, and the eighth subframe is the second special subframe.

If the user equipment is legacy user equipment, an uplink-downlink configuration that is of the serving cell and is configured by the base station for the user equipment may be an uplink-downlink configuration 0. Correspondingly, in this step, the determining, by a base station, a frame structure of a serving cell may include:

determining, by the base station, the frame structure of the serving cell of the user equipment, where the following may be specifically included: determining, by the base station, that the frame structure of the serving cell is a frame structure corresponding to an uplink-downlink configuration 0 in a frame structure type 2 in LTE release 8, where the following may be specifically included: Each radio frame includes 10 subframes, and in each radio frame, the first subframe and the sixth subframe are the downlink subframes, the third subframe, the fourth subframe, the fifth subframe, the eighth subframe, the ninth subframe, and the tenth subframe are the uplink subframes, and the second subframe and the seventh subframe are special subframes. The special subframe is a special subframe in the frame structure type 2 in LTE release 8. A subframe structure of the special subframe may be a subframe structure corresponding to a special subframe configuration 0 or a special subframe configuration 5 in LTE release 8. It should be noted that the frame structure of the serving cell is actually the foregoing defined frame structure in this step, and is different from the frame structure corresponding to the uplink-downlink configuration 0 in the frame structure type 2 in LTE release 8. Herein, according to the frame structure corresponding to the uplink-downlink configuration 0 in the frame structure type 2 in LTE release 8, the base station sends information only to or receives information only from user equipment supporting only LTE release 12 and earlier releases.

In this embodiment of the present invention, the serving cell is the serving cell corresponding to the user equipment. The serving cell corresponding to the user equipment may be a serving cell configured by a network side device for the user equipment, or a serving cell that serves the user equipment, or a serving cell accessed by the user equipment. The serving cell in this embodiment of the present invention may also be referred to as a carrier. In this embodiment of the present invention, the serving cell may be a primary serving cell or a secondary serving cell of the user equipment.

In this step, in a first aspect, the uplink-downlink configuration that is of the serving cell and is configured for the legacy user equipment is the uplink-downlink configuration 0, so that the user equipment sends or receives information according to the frame structure and HARQ timing that are corresponding to the uplink-downlink configuration 0 in LTE release 8. In a second aspect, in the frame structure of the serving cell, the subframe 1 is the downlink subframe, and the subframe l+4 is the uplink subframe, so that the UE supporting only LTE release 12 and earlier releases can send or receive information at least in these subframes. In a third aspect, the subframe l+5 is the first special subframe, and because the first 12 symbols in the first special subframe are downlink transmission symbols, physical layer measurement performed by the legacy user equipment in the subframe l+5 is not affected. In a fourth aspect, in the frame structure of the serving cell, the second subframe and the seventh subframe in each radio frame are set as the first special subframes or the second special subframes. When the second subframe and the seventh subframe in each radio frame are set as the first special subframes, because the first 12 symbols in the first special subframe are downlink transmission symbols, physical layer measurement performed, in the second subframe and the seventh subframe, by the user equipment supporting only LTE release 12 and earlier releases is not affected. When the second subframe and the seventh subframe in each radio frame are set as the second special subframes, while the user equipment supporting only LTE release 12 and earlier releases is notified that the uplink-downlink configuration of the serving cell is the uplink-downlink configuration 0, the user equipment is indicated that a special subframe configuration is the special subframe configuration 0 or the special subframe configuration 5, so that physical layer measurement performed, in the second subframe and the seventh subframe, by the user equipment supporting only LTE release 12 and earlier releases is not affected. According to the foregoing aspects, the new frame structure can be backward-compatible.

Step 702: The base station sends information to or receives information from user equipment in the serving cell based on the frame structure.

In this step, the base station sends information to or receives information from the user equipment in the serving cell based on the frame structure determined in step 701.

Implementation of this step is described in the following by using examples.

Example 1

This example is preferably applicable to a case in which the frame structure in step 701 is implemented by using Example 1 in step 701.

In a possible implementation, this step that the base station sends information to or receives information from the user equipment in the serving cell based on the frame structure in step 701 may be performed according to the following uplink HARQ timing:

The base station sends physical downlink shared channel transmission to the user equipment in a subframe n in the serving cell, or the base station sends, in a subframe n in the serving cell, a downlink control channel indicating downlink semi-persistent scheduling release, where n is an integer, and n is a subframe number; and the base station receives, in a subframe n+k, a hybrid automatic repeat request-acknowledgment HARQ-ACK response that is fed back by the user equipment and is corresponding to the physical downlink shared channel transmission or the downlink control channel that is sent in the subframe n in the serving cell, where k is an integer.

When the subframe n is corresponding to the second subframe in each radio frame, a value of k is 5; or otherwise, a value of k is 4.

In a second possible implementation, this step that the base station sends information to or receives information from the user equipment in the serving cell based on the frame structure in step 701 may be performed according to the following downlink HARQ timing:

The base station sends, to the user equipment in a subframe i, a downlink control channel that schedules a PUSCH; and the base station receives, in a subframe i+4 in the serving cell, the PUSCH scheduled by the downlink control channel, where i is an integer, and i is a subframe number.

In a third possible implementation, this step that the base station sends information to or receives information from the user equipment in the serving cell based on the frame structure in step 701 may be performed according to the following downlink HARQ timing:

The base station receives, in a subframe j in the serving cell, a PUSCH sent by the user equipment; and the base station sends, in a subframe j+6, an HARQ-ACK corresponding to the PUSCH, where j is an integer, and j is a subframe number.

In a fourth possible implementation, this step that the base station sends information to or receives information from the user equipment in the serving cell based on the frame structure in step 701 may be performed according to the following downlink HARQ timing:

The base station sends, in a subframe h, an HARQ-ACK corresponding to a PUSCH sent by the user equipment; and the base station receives retransmission of the PUSCH in a subframe h+4 in the serving cell, where h is an integer, and h is a subframe number.

Example 2

This example is preferably applicable to a case in which the frame structure in step 701 is implemented by using Example 2 in step 701.

In a first possible implementation, this step that the base station sends information to or receives information from the user equipment in the serving cell based on the frame structure in step 701 may be performed according to the following uplink HARQ timing:

The base station sends physical downlink shared channel transmission to the user equipment in a subframe n in the serving cell, or the base station sends, to the user equipment in a subframe n in the serving cell, a downlink control channel indicating downlink semi-persistent scheduling release; and the base station receives, in a subframe n+k, a hybrid automatic repeat request-acknowledgment HARQ-ACK response that is fed back by the user equipment and is corresponding to the physical downlink shared channel transmission or the downlink control channel that is sent in the subframe n in the serving cell, where n is an integer, and n is a subframe number; k is an integer; and when the subframe n is corresponding to the first subframe in each radio frame, a value of k is 4; or otherwise, a value of k is 5.

In a second possible implementation, this step that the base station sends information to or receives information from the user equipment in the serving cell based on the frame structure in step 701 may be performed according to the following downlink HARQ timing:

The base station sends, to the user equipment in a subframe i, a downlink control channel that schedules a PUSCH; and the base station receives, in a subframe i+5 in the serving cell, the PUSCH scheduled by the downlink control channel, where i is an integer, and i is a subframe number.

In a third possible implementation, this step that the base station sends information to or receives information from the user equipment in the serving cell based on the frame structure in step 701 may be performed according to the following downlink HARQ timing:

The base station receives, in a subframe j in the serving cell, a PUSCH sent by the user equipment; and the base station sends, in a subframe j+5, an HARQ-ACK corresponding to the PUSCH, where j is an integer, and j is a subframe number.

In a fourth possible implementation, this step that the base station sends information to or receives information from the user equipment in the serving cell based on the frame structure in step 701 may be performed according to the following downlink HARQ timing:

The base station sends, in a subframe h, an HARQ-ACK corresponding to a PUSCH sent by the user equipment; and the base station receives retransmission of the PUSCH in a subframe h+5 in the serving cell, where h is an integer, and h is a subframe number.

Example 3

This example is preferably applicable to a case in which the frame structure in step 701 is implemented by using Example 3 or 4 in step 701.

In a first possible implementation, this step that the base station sends information to or receives information from the user equipment in the serving cell based on the frame structure in step 701 may be performed according to the following uplink HARQ timing:

The base station sends physical downlink shared channel transmission to the user equipment in a subframe n−4 in the serving cell, or the base station sends, to the user equipment in a subframe n−4 in the serving cell, a downlink control channel indicating downlink semi-persistent scheduling release, where n is an integer, and n is a subframe number; and the base station receives, in a subframe n, an HARQ-ACK response that is fed back by the user equipment and is corresponding to the physical downlink shared channel transmission or the downlink control channel that is sent in the subframe n−4 in the serving cell.

In a second possible implementation, this step that the base station sends information to or receives information from the user equipment in the serving cell based on the frame structure in step 701 may be performed according to the following downlink HARQ timing:

The base station sends, to the user equipment in a subframe i, a downlink control channel that schedules a PUSCH; and the base station receives, in a subframe i+4 in the serving cell, the PUSCH scheduled by the downlink control channel, where i is an integer, and i is a subframe number.

In a third possible implementation, this step that the base station sends information to or receives information from the user equipment in the serving cell based on the frame structure in step 701 may be performed according to the following downlink HARQ timing:

The base station receives, in a subframe j in the serving cell, a PUSCH sent by the user equipment; and the base station sends, in a subframe j+4, an HARQ-ACK corresponding to the PUSCH, where j is an integer, and j is a subframe number.

In a fourth possible implementation, this step that the base station sends information to or receives information from the user equipment in the serving cell based on the frame structure in step 701 may be performed according to the following downlink HARQ timing:

The base station sends, in a subframe h, an HARQ-ACK corresponding to a physical uplink shared channel sent by the user equipment; and the base station receives retransmission of the physical uplink shared channel in a subframe h+4 in the serving cell, where h is an integer, and h is a subframe number.

If the subframe h+4 is the downlink subframe or the first special subframe, the base station receives retransmission of the physical uplink shared channel in a subframe h+4+8×a in the serving cell, where a is a positive integer greater than or equal to 1, and the subframe h+4+8×a is the first available uplink subframe or second special subframe.

In this step, if the user equipment is legacy user equipment, the base station may send information to or receive information from the user equipment in the serving cell based on the frame structure and according to HARQ timing in LTE release 8. The following may be specifically included:

The base station sends information to or receives information from the user equipment based on the frame structure and according to the HARQ timing corresponding to the uplink-downlink configuration 0 in the frame structure type 2 in LTE release 8. Details are as follows.

In a first possible implementation, this step that the base station sends information to or receives information from the user equipment in the serving cell based on the frame structure in step 701 may be performed according to the following uplink HARQ timing:

The base station sends physical downlink shared channel transmission to the user equipment in a subframe n−4 in the serving cell, or the base station sends, to the user equipment in a subframe n−4 in the serving cell, a downlink control channel indicating downlink semi-persistent scheduling release, where n is an integer, and n is a subframe number; and the base station receives, in a subframe n, a hybrid automatic repeat request-acknowledgment HARQ-ACK response that is fed back by the user equipment and is corresponding to the physical downlink shared channel transmission or the downlink control channel that is sent in the subframe n−4 in the serving cell.

In a second possible implementation, this step that the user equipment sends or receives information in the serving cell based on the frame structure in step 701 may be performed according to the following downlink HARQ timing:

The base station sends, to the user equipment in a subframe i, a downlink control channel that schedules a PUSCH; and the base station receives, in a subframe i+4 in the serving cell, the PUSCH scheduled by the downlink control channel, where i is an integer, and i is a subframe number.

In a third possible implementation, this step that the user equipment sends or receives information in the serving cell based on the frame structure in step 701 may be performed according to the following downlink HARQ timing:

The base station receives, in a subframe j in the serving cell, a PUSCH sent by the user equipment; and the base station sends, in a subframe j+6, an HARQ-ACK corresponding to the PUSCH, where j is an integer, and j is a subframe number.

In a fourth possible implementation, this step that the user equipment sends or receives information in the serving cell based on the frame structure in step 701 may be performed according to the following downlink HARQ timing:

The base station sends, in a subframe h, an HARQ-ACK corresponding to a PUSCH sent by the user equipment; and the base station receives retransmission of the PUSCH in a subframe h+4 in the serving cell, where h is an integer, and h is a subframe number.

In this step, it can be learned from any HARQ timing defined in Example 1 to Example 3 that, the HARQ timing does not depend on a specific uplink-downlink configuration of the serving cell, that is, same HARQ timing is used for different uplink-downlink configurations. Therefore, compared with the frame structure type 2 in an existing LTE release, implementation complexity and protocol complexity can be reduced. In addition, the uplink HARQ timing is used, so that an HARQ-ACK only for one downlink subframe or one first special subframe needs to be fed back in one uplink subframe or one second special subframe. Therefore, compared with a case in which HARQ-ACKs for multiple downlink subframes need to be fed back in one uplink subframe in an existing LTE system, a quantity of feedbacks is reduced, and HARQ-ACK performance is improved. In addition, the frame structure enables the user equipment supporting only LTE release 12 and earlier releases to send or receive information according to the HARQ timing corresponding to the uplink-downlink configuration 0 in the frame structure type 2 in LTE release 8, so that backward-compatibility is kept.

In this embodiment, the base station determines the frame structure of the serving cell. Each radio frame corresponding to the frame structure includes the at least one downlink subframe, the at least one uplink subframe, and the at least one special subframe. The special subframe is the first special subframe or the second special subframe. The at least one downlink subframe includes the subframe l. The at least one uplink subframe includes the subframe l+4. The at least one special subframe includes the subframe l+5, and the subframe l+5 is the first special subframe, where l is an integer, and l is an odd multiple of 5. The base station sends information to or receives information from the user equipment in the serving cell based on the frame structure. The special subframe includes the time domain symbol used for downlink transmission, the guard period GP, and the time domain symbol used for uplink transmission. The quantity of time domain symbols used for downlink transmission is greater than the quantity of time domain symbols used for uplink transmission in the first special subframe. The quantity of time domain symbols used for downlink transmission is less than the quantity of time domain symbols used for uplink transmission in the second special subframe. The downlink transmission includes physical downlink control channel transmission. The uplink transmission includes hybrid automatic repeat request-acknowledgment HARQ-ACK transmission.

Therefore, same HARQ timing is used for different uplink-downlink configurations, and compared with a frame structure type 2 in an existing LTE release, implementation complexity and protocol complexity of a TDD system are reduced.

A person skilled in the art may clearly understand that, the technologies in the embodiments of the present application may be implemented by software in addition to a necessary general hardware platform. Based on such an understanding, the technical solutions of the present application essentially or the part contributing to the prior art may be implemented in a form of a software product. The software product may be stored in a storage medium, such as a ROM/RAM, a hard disk, or an optical disc, and include several instructions for instructing a computer device (which may be a personal computer, a server, a network device, or the like) to perform the methods described in the embodiments or some parts of the embodiments of the present application.

The embodiments in this specification are all described in a progressive manner. For same or similar parts in the embodiments, refer to these embodiments, and each embodiment focuses on a difference from other embodiments. Particularly, a system embodiment is basically similar to a method embodiment, and therefore, is described briefly. For related parts, refer to partial descriptions in the method embodiment.

The foregoing descriptions are the embodiments of the present application, but are not intended to limit the protection scope of the present application. Any modification, equivalent replacement, and improvement made without departing from the principle of the present application shall fall within the protection scope of the present application.

What is claimed is:

1. User equipment, comprising:
a processor, configured to determine a frame structure of a serving cell, wherein a radio frame corresponding to the frame structure comprises at least one downlink subframe, at least one uplink subframe, and at least one special subframe, wherein the special subframe is a first special subframe or a second special subframe, the at least one downlink subframe comprises a subframe l, the at least one uplink subframe comprises a subframe l+4, the at least one special subframe comprises a subframe l+5, and the subframe l+5 is the first special subframe, wherein l is a positive integer, l is an odd multiple of 5, and l is a subframe number; and
a transceiver, configured to send or receive information in the serving cell based on the determined frame structure, wherein
the special subframe comprises a symbol used for downlink transmission, a guard period, and a symbol used for uplink transmission, wherein a quantity of symbols used for downlink transmission is greater than a quantity of symbols used for uplink transmission in the first special subframe, a quantity of symbols used for downlink transmission is less than a quantity of symbols used for uplink transmission in the second special subframe, the downlink transmission comprises physical downlink control channel transmission, and the uplink transmission comprises hybrid automatic repeat request-acknowledgment HARQ-ACK transmission.

2. The user equipment according to claim 1, wherein each radio frame corresponding to the frame structure comprises 10 subframes, and wherein the second subframe and a seventh subframe in each radio frame are the first special subframes.

3. The user equipment according to claim 1, wherein in the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, wherein m is an integer, the subframe m is not the second subframe in each radio frame, and m is a subframe number.

4. The user equipment according to claim 1, wherein the processor is further configured to:
determine the frame structure of the serving cell according to an uplink-to-downlink ratio of the serving cell; and, wherein:
when the uplink-to-downlink ratio of the serving cell is 1 to 9, each radio frame corresponding to the frame structure comprises 10 subframes, wherein in each radio frame, a fourth subframe and a sixth subframe are the downlink subframes, a tenth subframe is the uplink subframe, and the first subframe, the second subframe, a third subframe, a fifth subframe, a seventh subframe, an eighth subframe, and a ninth subframe are the first special subframes; or
when the uplink-to-downlink ratio of the serving cell is 2 to 8, each radio frame corresponding to the frame structure comprises 10 subframes, wherein in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or
when the uplink-to-downlink ratio of the serving cell is 3 to 7, each radio frame corresponding to the frame structure comprises 10 subframes, wherein in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or
when the uplink-to-downlink ratio of the serving cell is 4 to 6, each radio frame corresponding to the frame structure comprises 10 subframes, wherein in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or
when the uplink-to-downlink ratio of the serving cell is 5 to 5, each radio frame corresponding to the frame structure comprises 10 subframes, wherein in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

5. The user equipment according to claim 1, wherein the transceiver is configured to:
receive, in a subframe n in the serving cell, physical downlink shared channel transmission or a downlink control channel indicating downlink semi-persistent scheduling release, wherein n is an integer, and n is a subframe number; and
send, in a subframe n+k, an HARQ-ACK corresponding to the physical downlink shared channel transmission or the downlink control channel that is received in the subframe n in the serving cell, wherein k is an integer, and
when the subframe n is corresponding to the second subframe in each radio frame, a value of k is 5; or otherwise, a value of k is 4.

6. The user equipment according to claim 1, wherein each radio frame corresponding to the frame structure comprises 10 subframes, and the first subframe, the second subframe, and a seventh subframe in each radio frame are the first special subframes.

7. The user equipment according to claim 1, wherein the processor is configured to:

determine the frame structure of the serving cell according to an uplink-to-downlink ratio of the serving cell; and wherein when the uplink-to-downlink ratio of the serving cell is 1 to 9, each radio frame comprises 10 subframes, wherein in each radio frame, a sixth subframe is the downlink subframe, a tenth subframe is the uplink subframe, and the first subframe, the second subframe, a third subframe, a fourth subframe, a fifth subframe, a seventh subframe, an eighth subframe, and the ninth subframe are the first special subframes; or when the uplink-to-downlink ratio of the serving cell is 2 to 8, each radio frame comprises 10 subframes, wherein in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3 to 7, each radio frame comprises 10 subframes, wherein in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4 to 6, each radio frame comprises 10 subframes, wherein in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5 to 5, each radio frame comprises 10 subframes, wherein in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

8. The user equipment according to claim 1, wherein the transceiver is further configured to:

receive, in a subframe n in the serving cell, physical downlink shared channel transmission or a downlink control channel indicating downlink semi-persistent scheduling release, wherein n is an integer, and n is a subframe number; and send, in a subframe n+k, an HARQ-ACK response corresponding to the physical downlink shared channel transmission or the downlink control channel that is received in the subframe n in the serving cell, wherein k is an integer, and when the subframe n is corresponding to the first subframe in each radio frame, a value of k is 4; or otherwise, a value of k is 5.

9. An information sending or receiving method, comprising:

determining, by user equipment, a frame structure of a serving cell, wherein a radio frame corresponding to the frame structure comprises at least one downlink subframe, at least one uplink subframe, and at least one special subframe, wherein the special subframe is a first special subframe or a second special subframe, the at least one downlink subframe comprises a subframe l, the at least one uplink subframe comprises a subframe l+4, the at least one special subframe comprises a subframe l+5, and the subframe l+5 is the first special subframe, wherein 1 is a positive integer, l is an odd multiple of 5, and l is a subframe number; and sending or receiving, by the user equipment, information in the serving cell based on the frame structure, wherein the special subframe comprises a symbol used for downlink transmission, a guard period GP, and a symbol used for uplink transmission, wherein a quantity of symbols used for downlink transmission is greater than a quantity of symbols used for uplink transmission in the first special subframe, a quantity of symbols used for downlink transmission is less than a quantity of symbols used for uplink transmission in the second special subframe, the downlink transmission comprises physical downlink control channel transmission, and the uplink transmission comprises hybrid automatic repeat request-acknowledgment HARQ-ACK transmission.

10. The method according to claim 9, wherein each radio frame corresponding to the frame structure comprises 10 subframes, and a second subframe and a seventh subframe in each radio frame are the first special subframes.

11. The method according to claim 9, wherein in the radio frame corresponding to the frame structure, if a subframe m is the downlink subframe or the first special subframe, a subframe m+4 is the uplink subframe or the second special subframe; or if a subframe m is the uplink subframe or the second special subframe, a subframe m−4 is the downlink subframe, the first special subframe, or the second special subframe, and a subframe m+6 is the downlink subframe, the first special subframe, or the second special subframe, wherein m is an integer, the subframe m is not the second subframe in each radio frame, and m is a subframe number.

12. The method according to claim 9, wherein the determining, by user equipment, a frame structure of a serving cell comprises:

determining, by the user equipment, the frame structure of the serving cell according to an uplink-to-downlink ratio of the serving cell, wherein the following is specifically comprised:

when the uplink-to-downlink ratio of the serving cell is 1 to 9, each radio frame corresponding to the frame structure comprises 10 subframes, wherein in each radio frame, a fourth subframe and a sixth subframe are the downlink subframes, a tenth subframe is the uplink subframe, and the first subframe, the second subframe, a third subframe, a fifth subframe, a seventh subframe, an eighth subframe, and a ninth subframe are the first special subframes; or when the uplink-to-downlink ratio of the serving cell is 2 to 8, each radio frame corresponding to the frame structure comprises 10 subframes, wherein in each radio frame, the third subframe, the fourth subframe, and the sixth subframe are the downlink subframes, the ninth subframe and the tenth subframe are the uplink subframes, and the first subframe, the second subframe, the fifth subframe, the seventh subframe, and the eighth subframe are the first special subframes; or when the uplink-to-downlink ratio of the serving cell is 3 to 7, each radio frame corresponding to the frame structure comprises 10 subframes, wherein in each radio frame, the third subframe, the fourth subframe, and the sixth subframe are the downlink subframes, the ninth subframe and the tenth subframe are the uplink subframes, the first subframe, the second subframe, the seventh subframe, and the eighth subframe are the first special subframes, and the fifth subframe is the second special subframe; or when the uplink-to-downlink ratio of the serving cell is 4 to 6, each radio frame corresponding to the frame structure comprises 10 subframes, wherein in each radio frame, the third subframe, the fourth subframe, and the sixth subframe are the downlink subframes, the ninth subframe and the tenth subframe are the uplink subframes, the first subframe, the second subframe, and the seventh subframe are the first special subframes, and the fifth subframe and the eighth subframe are the second special subframes; or when the uplink-to-downlink ratio of the serving cell is 5 to 5, each radio frame corresponding to the frame structure comprises 10 subframes, wherein in each radio frame, the fourth subframe and the sixth subframe are the downlink subframes, the tenth subframe is the uplink subframe, the first subframe, the second subframe, and the seventh subframe are the first special subframes, and the third subframe, the fifth subframe, the eighth subframe, and the ninth subframe are the second special subframes.

13. The method according to claim 9, wherein the sending or receiving, by the user equipment, information in the serving cell based on the frame structure comprises:

receiving, by the user equipment in a subframe n in the serving cell, physical downlink shared channel transmission or a downlink control channel indicating downlink semi-persistent scheduling release, wherein n is an integer, and n is a subframe number; and sending, by the user equipment in a subframe n+k, an HARQ-ACK corresponding to the physical downlink shared channel transmission or the downlink control channel that is received in the subframe n in the serving cell, wherein k is an integer, and when the subframe n is corresponding to the second subframe in each radio frame, a value of k is 5; or otherwise, a value of k is 4.

14. The method according to claim 9, wherein the determining, by user equipment, a frame structure of a serving cell comprises:

determining, by the user equipment, the frame structure of the serving cell according to an uplink-to-downlink ratio of the serving cell, wherein the following is specifically comprised:

when the uplink-to-downlink ratio of the serving cell is 1 to 9, each radio frame comprises 10 subframes, wherein in each radio frame, a sixth subframe is the downlink subframe, a tenth subframe is the uplink subframe, and the first subframe, the second subframe, a third subframe, a fourth subframe, a fifth subframe, a seventh subframe, an eighth subframe, and the ninth subframe are the first special subframes; or when the uplink-to-downlink ratio of the serving cell is 2 to 8, each radio frame comprises 10 subframes, wherein in each radio frame, the sixth subframe and the eighth subframe are the downlink subframes, the third subframe and the tenth subframe are the uplink subframes, and the first subframe, the second subframe, the fourth subframe, the fifth subframe, the seventh subframe, and the ninth subframe are the first special subframes; or when the uplink-to-downlink ratio of the serving cell is 3 to 7, each radio frame comprises 10 subframes, wherein in each radio frame, the sixth subframe and the eighth subframe are the downlink subframes, the third subframe, the fourth subframe, and the tenth subframe are the uplink subframes, and the first subframe, the second subframe, the fifth subframe, the seventh subframe, and the ninth subframe are the first special subframes; or when the uplink-to-downlink ratio of the serving cell is 4 to 6, each radio frame comprises 10 subframes, wherein in each radio frame, the sixth subframe and the eighth subframe are the downlink subframes, the third subframe and the tenth subframe are the uplink subframes, the fourth subframe and the ninth subframe are the second special subframes, and the first subframe, the second subframe, the fifth subframe, and the seventh subframe are the first special subframes; or when the uplink-to-downlink ratio of the serving cell is 5 to 5, each radio frame comprises 10 subframes, wherein in each radio frame, the sixth subframe is the downlink subframe, the tenth subframe is the uplink subframe, the third subframe, the fourth subframe, the eighth subframe, and the ninth subframe are the second special subframes, and the first subframe, the second subframe, the fifth subframe, and the seventh subframe are the first special subframes.

15. The method according to claim 9, wherein the sending or receiving, by the user equipment, information in the serving cell based on the frame structure comprises:

receiving, by the user equipment in a subframe n in the serving cell, physical downlink shared channel transmission or a downlink control channel indicating downlink semi-persistent scheduling release, wherein n is an integer, and n is a subframe number; and sending, by the user equipment in a subframe n+k, an HARQ-ACK response corresponding to the physical downlink shared channel transmission or the downlink control channel that is received in the subframe n in the serving cell, wherein k is an integer, and when the subframe n is corresponding to the first subframe in each radio frame, a value of k is 4; or otherwise, a value of k is 5.

* * * * *